(12) United States Patent
Ho et al.

(10) Patent No.: US 11,194,164 B2
(45) Date of Patent: Dec. 7, 2021

(54) HEAD-MOUNTED DISPLAY DEVICE

(71) Applicant: HTC Corporation, Taoyuan (TW)

(72) Inventors: Hsiu-Fan Ho, Taoyuan (TW);
Chin-Kai Sun, Taoyuan (TW);
Wei-Cheng Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 146 days.

(21) Appl. No.: 16/663,352

(22) Filed: Oct. 25, 2019

(65) Prior Publication Data
US 2020/0326550 A1 Oct. 15, 2020

Related U.S. Application Data

(60) Provisional application No. 62/831,737, filed on Apr. 10, 2019.

(51) Int. Cl.
*G02B 27/01* (2006.01)
*G02C 5/22* (2006.01)

(52) U.S. Cl.
CPC .......... *G02B 27/0176* (2013.01); *G02C 5/22* (2013.01); *G02B 2027/0178* (2013.01)

(58) Field of Classification Search
CPC .. G02C 5/22; G02C 2200/18; G02B 27/0176; G02B 2027/0178
See application file for complete search history.

(56) References Cited

U.S. PATENT DOCUMENTS

| 2010/0220281 A1* | 9/2010 | Hones ................... G02C 7/021 351/44 |
| 2016/0048025 A1* | 2/2016 | Cazalet ............. G02B 27/0176 351/116 |
| 2017/0090200 A1 | 3/2017 | Motoe et al. |
| 2017/0090212 A1* | 3/2017 | Rinehart ................ G02C 5/146 |
| 2018/0249151 A1* | 8/2018 | Freeman .............. A61B 5/1123 |
| 2019/0121143 A1* | 4/2019 | Zhang ....................... G02C 9/00 |

(Continued)

FOREIGN PATENT DOCUMENTS

| CN | 202008555 | 10/2011 |
| CN | 102439510 | 5/2012 |
| CN | 104423058 | 3/2015 |

(Continued)

OTHER PUBLICATIONS

"Office Action of Taiwan Counterpart Application", dated Jul. 1, 2020, p. 1-p. 6.

(Continued)

*Primary Examiner* — Neil R Mikeska
(74) *Attorney, Agent, or Firm* — JCIPRNET

(57) ABSTRACT

A head-mounted display device includes a display portion, a main frame, two arms, and two adjusting pieces. The main frame carries the display portion. The arms are disposed on opposite sides of the main frame, and the end portions of the arms are pivotally connected to the main frame such that the arms are adapted to rotate away from the main frame during an unfolding process and adapted to rotate toward the main frame during a folding process. The adjusting pieces are respectively disposed on pivot paths of the arms, and the adjusting piece is adapted to from a structural interference with the corresponding arm and the main frame during the unfolding process to limit a degree of rotation of the arm.

11 Claims, 35 Drawing Sheets

(56) References Cited

U.S. PATENT DOCUMENTS

2021/0149216 A1* 5/2021 Meynen ................ G02C 7/101

FOREIGN PATENT DOCUMENTS

| CN | 102411209 | 7/2015 |
| CN | 107409189 | 11/2017 |
| WO | 2013179343 | 12/2013 |
| WO | 2018092859 | 5/2018 |

OTHER PUBLICATIONS

"Office Action of China Counterpart Application", dated Sep. 29, 2021, p. 1-p. 7.

* cited by examiner

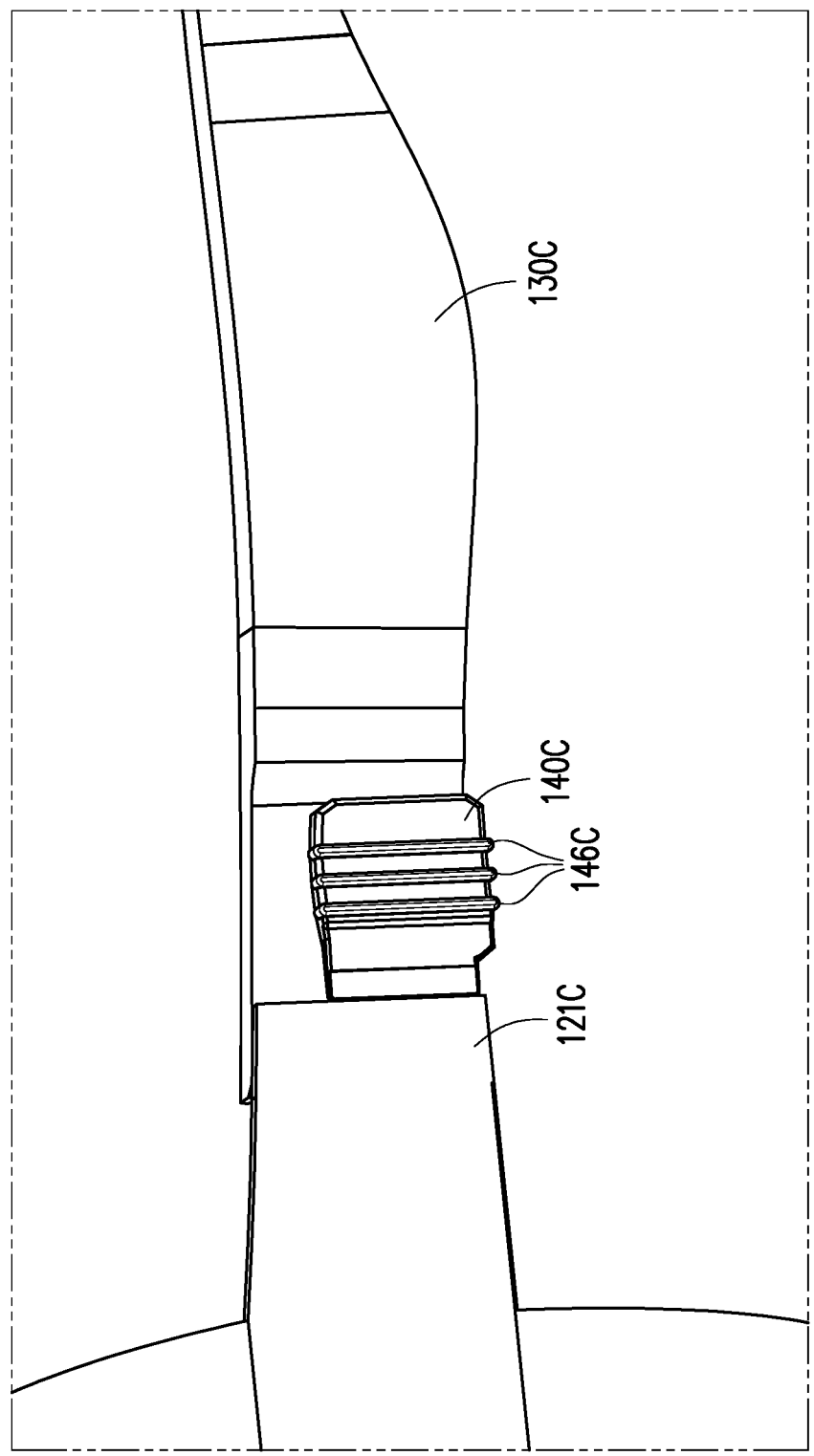

HEAD-MOUNTED DISPLAY DEVICE

CROSS-REFERENCE TO RELATED APPLICATION

This application claims the priority benefit of U.S. Provisional Application Ser. No. 62/831,737, filed on Apr. 10, 2019. The entirety of the above-mentioned patent application is hereby incorporated by reference herein and made a part of this specification.

TECHNICAL FIELD

The present application relates to a head-mounted display device, and more particularly, to a head-mounted display device capable of adjusting a wearable size.

BACKGROUND

Virtual Reality (VR) technology belongs to a new generation of display technology, which mainly combines computer graphics systems and various display and control devices to generate virtual 3D images. The virtual 3D images are mainly realized by VR glasses. The VR glasses, as a portable product with a fixing manner similar to the conventional glasses, are rested on the ears at both sides of the user's head by arms similar to glasses temples. However, the arm size of the conventional VR glasses cannot be adapted to users with different head sizes. Users with larger head size may suffer a wearing discomfort due to overtightness, and users with smaller head size may encounter problems like loosen arms and even device slippage.

The current solution on the market is to allow the user to bend the arms to adjust a wearing space. However, achieving a good clamping force of the arm requires a large plastic deformation critical force, which will result in difficulties for the user to bend the temples to adjust a wearing size. On the other hand, to allow the user to easily bend the temples, the plastic deformation critical force needs to be lowered. In this way, as the clamping force of such the arm is weakened, the VR glasses may be easily slipped due to its own weight or inertia.

SUMMARY

The application provides a head-mounted display device that can be adapted to head sizes for different users and maintains the clamping force so that it can be securely worn on the user's head.

The head-mounted display device of the present application includes a display portion, a main frame, arms, and adjusting pieces. The main frame carries the display portion. The arms are disposed on opposite sides of the main frame, and the end portions of the arms are pivotally connected to the main frame such that the arms are adapted to rotate away from the main frame during an unfolding process and adapted to rotate toward the main frame during a folding process. The adjusting pieces are respectively disposed on pivot paths of the arms, and the adjusting piece is adapted to from a structural interference with the corresponding arm and the main frame during the unfolding process to limit a degree of rotation of the arm.

Based on the above, the adjusting piece of the head-mounted display device of the present application is disposed on the pivot path of the arm such that the angle of rotation the arm can be unfolded to is limited by the adjusting piece that enters and is caught between the arm and the main frame. Therefore, according to head size, the user can adjust and maintain the angle of rotation by the adjusting piece to match the wearing size and maintain the clamping force.

To make the aforementioned more comprehensible, several embodiments accompanied with drawings are described in detail as follows.

BRIEF DESCRIPTION OF THE DRAWINGS

FIG. 8C is a 3D view of the head-mounted display device of FIG. 8A from another perspective.

DESCRIPTION OF THE EMBODIMENTS

Figure 1A:
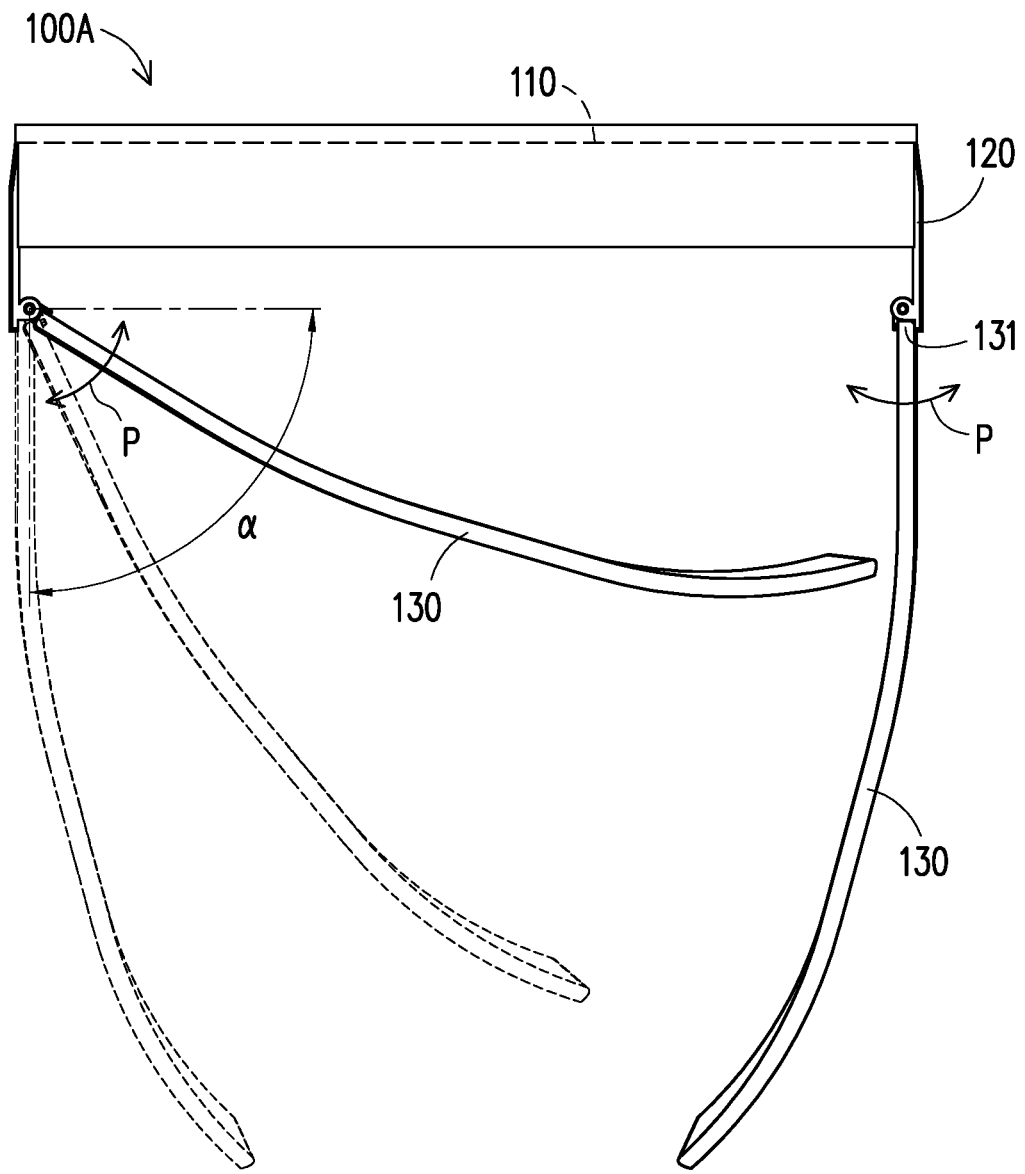
FIG. 1A to FIG. 1C are top views of a head-mounted display device according to an embodiment of the invention.
Figure 1B:
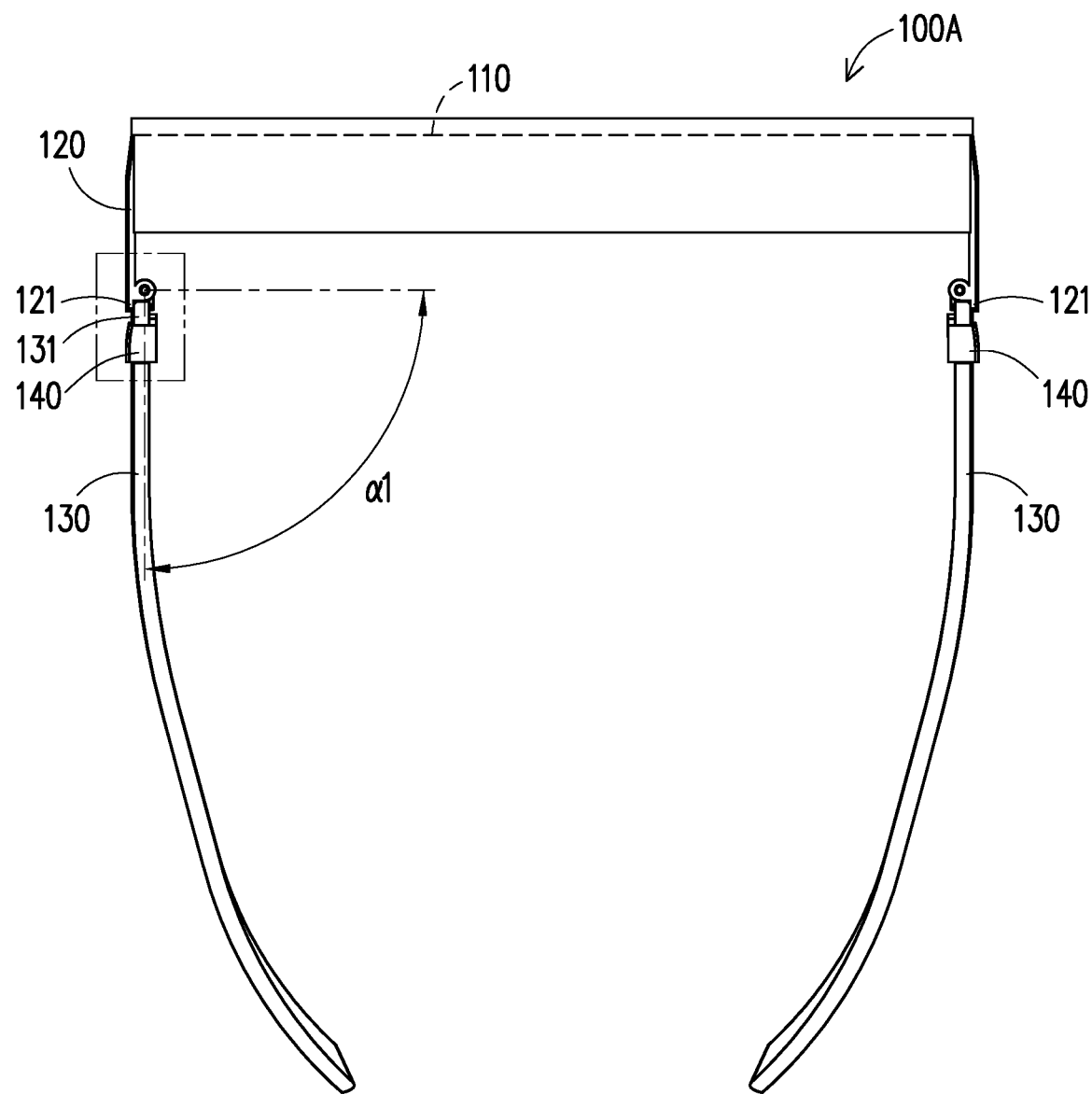
Figure 1C:
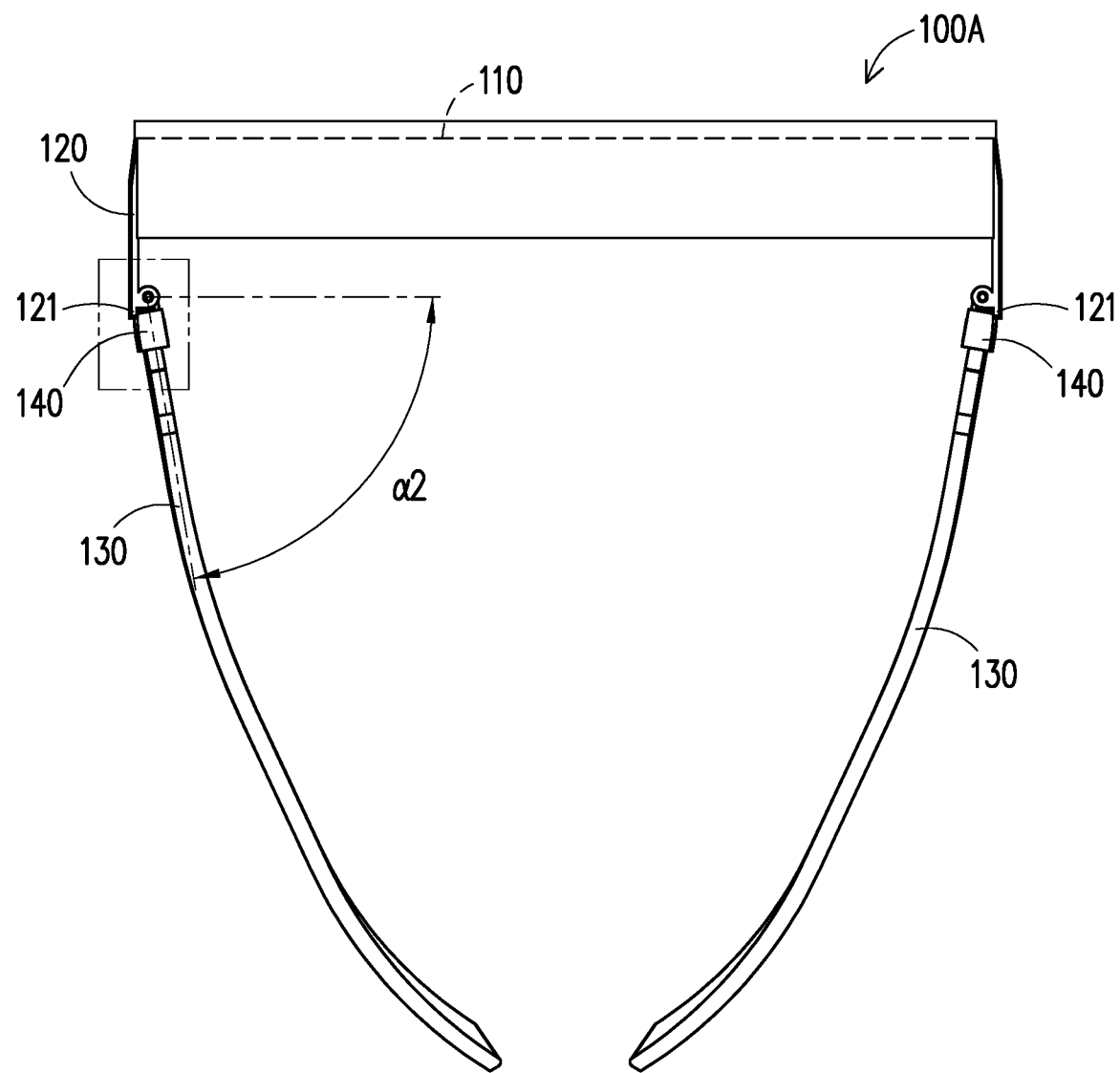

FIG. 1A to FIG. 1C are top views of a head-mounted display device according to an embodiment of the invention. It should be noted that FIG. 1A only illustrates an infrastructure of the head mounted display device. Referring to FIG. 1A, a head-mounted display device 100A includes a display portion 110, a main frame 120 and two arms 130. The main frame 120 is adapted to be rested on a front portion of the user's head. The two arms 130 are adapted to be rested on two side portions of the user's head and configured to provide a clamping force on the two side portions of the user's head. The display portion 110 is configured to output images to both eyes of the user. More specifically, the display portion 110 includes necessary electronic components for outputting the images to both eyes of the user, such as a lens, a display, and a circuit board. For simplicity, the electronic components in the display portion 110 are not illustrated.

In this embodiment, the main frame 120 carries the display portion 110. The two arms 130 are disposed on opposite sides of the main frame 120, and an end portion 131 of each of the arms 130 is pivotally connected to the main frame 120.

In the above configuration, the arm 130 moves on a pivot path P defined by an angle of rotation α such that the arm 130 can rotate away from the main frame 120 during an unfolding process to be unfolded to a maximum angle state, or can rotate toward the main frame 120 during a folding process to be folded to a minimum angle state.

Referring to FIG. 1B and FIG. 1C, the head-mounted display device 100A further includes two adjusting pieces 140. The adjusting piece 140 is disposed on the pivot path P (FIG. 1A) defined by the angle of rotation α (FIG. 1A) and configured to limit a maximum value of the angle of rotation α (FIG. 1A).

As shown by FIG. 1B, the adjusting piece 140 does not form a structural interference with the corresponding arm 130 and the main frame 120 yet, and the maximum value of the angle of rotation α is a first maximum angle of rotation α1. As shown by FIG. 1C, by moving the adjusting piece 140 on the arm 130, the adjusting piece 140 forms the structural interference with the arm 130 and the main frame 120 to limit the angle of rotation α such that the maximum value of the angle of rotation α is a second maximum angle of rotation α2. Therefore, the head-mounted display device 100A of the present embodiment can provide different maximum angles of rotation to be adapted to users with different head sizes. Compared with the general nearsighted glasses, since the head-mounted display device 100A is heavier in weight, the arm 130 needs to provide a larger clamping force so the head-mounted display device 100A can be securely worn on the user's head. Users with different head sizes can select the maximum angle of rotation appropriately based on wearing comfort and stability so the head mounted display device 100A can be securely worn on the user's head and less likely to slide or shake due to its own weight or inertia.

Figure 2A:
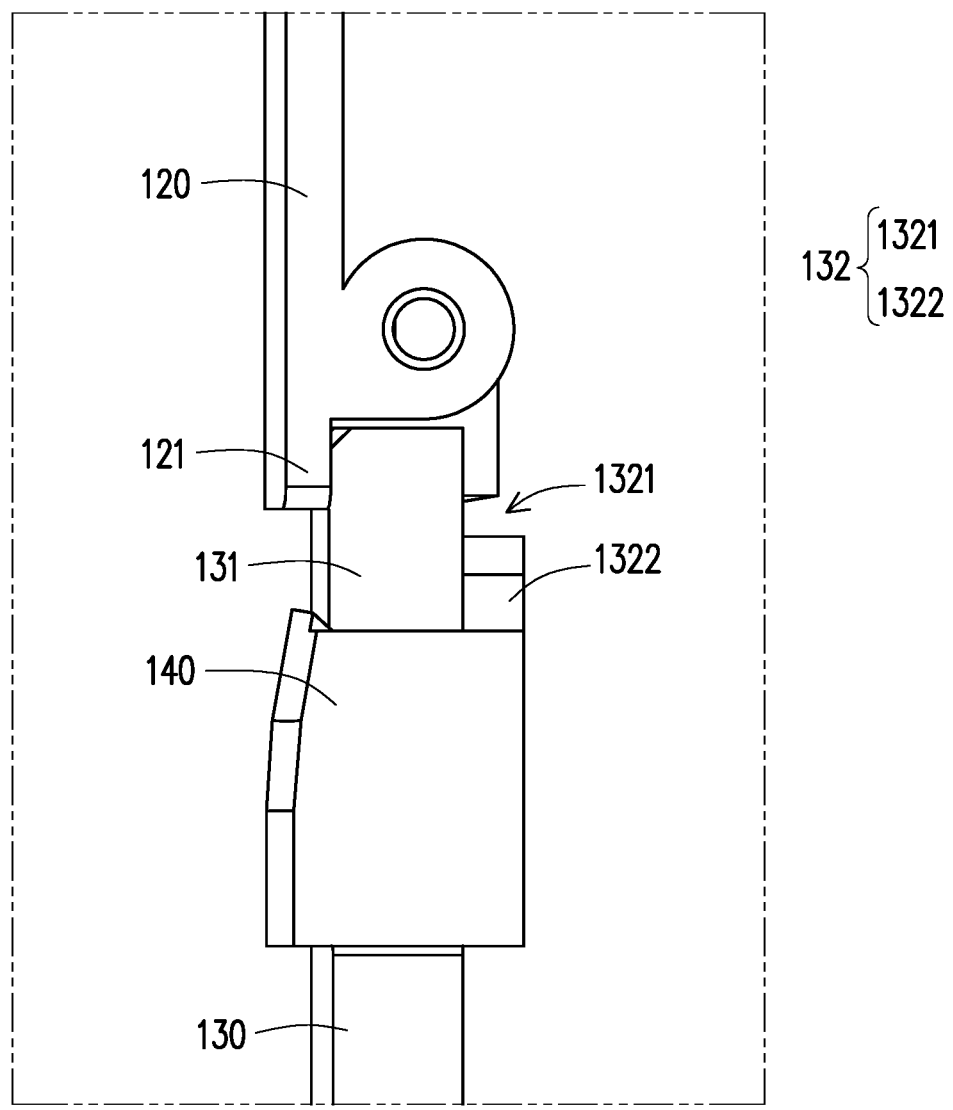
FIG. 2A and FIG. 2B are partial enlarged views of the head-mounted display device of FIG. 1B and FIG. 1C, respectively.
Figure 2B:
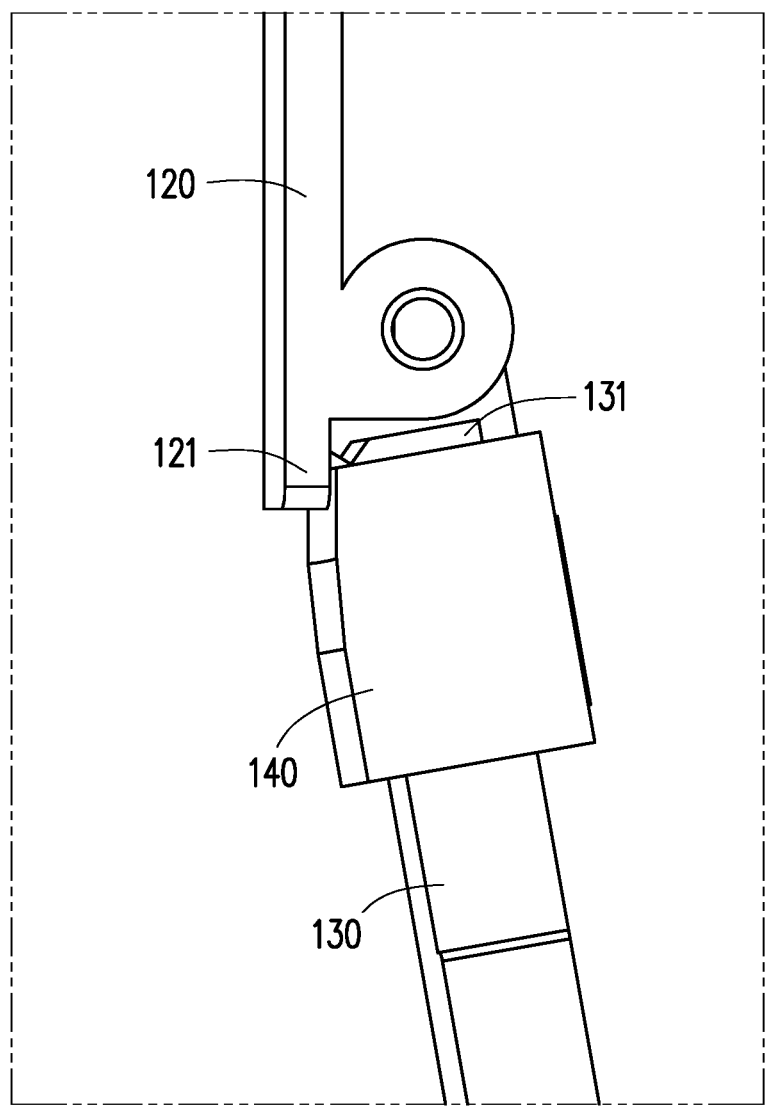

FIG. 2A and FIG. 2B are partial enlarged views of the head-mounted display device of FIG. 1B and FIG. 1C, respectively. Referring to FIG. 2A and FIG. 2B, in this embodiment, the adjusting pieces 140 are disposed on the arms 130. However, in other embodiments, the adjusting pieces 140 may also be disposed on the main frame 120, and it is within the scope of the present application as long as the two adjusting pieces 140 are respectively disposed on the pivot paths P of the arms 130.

In this embodiment, the adjusting piece 140 can move between a first position shown by FIG. 2A and a second position shown by FIG. 2B. The second position shown by FIG. 2B is located between the first position shown by FIG. 2A and the end portion 131.

In this embodiment, by moving the position of the adjusting piece 140, the adjusting piece 140 can form the structural interference with the corresponding arm 130 and the main frame 120 to limit the degree of rotation of the arm 130 during the unfolding process of the arm 130. In other words, the user can move the adjusting piece 140 on the arm 130 for limiting a relative angle of the arm 130 and the main frame 120 to thereby achieve the purpose of adjusting the wearing space between the two arms 130.

Specifically, when the adjusting piece 140 is in the first position shown by FIG. 2A, the two arms 130 can be unfolded to the first maximum angle of rotation α1 shown by FIG. 1B. When the adjusting piece 140 enters and is caught between the arm 130 and the main frame 120 in the second position shown by FIG. 2B, the two arms 130 can be unfolded to the second maximum angle of rotation α2 shown by FIG. 1C. In this embodiment, the second maximum angle of rotation α2 is less than the first maximum angle of rotation α1. In other words, when the adjusting piece 140 is in the first position shown by FIG. 2A, the head-mounted display device 100A is adapted to users with larger head size. When the adjusting piece 140 is in the second position shown by FIG. 2B, the head-mounted display device 100A is adapted to users with smaller head size.

The head-mounted display device 100A of the present embodiment is additionally disposed with the adjusting pieces 140 based on the infrastructure shown by FIG. 1A. In this way, the head-mounted display device 100A of the present embodiment can adjust the wearing space by adjusting the adjusting pieces 140 so the head-mounted display device 100A can be adapted to head sizes for different users and can maintain its clamping force.

Figure 3A:
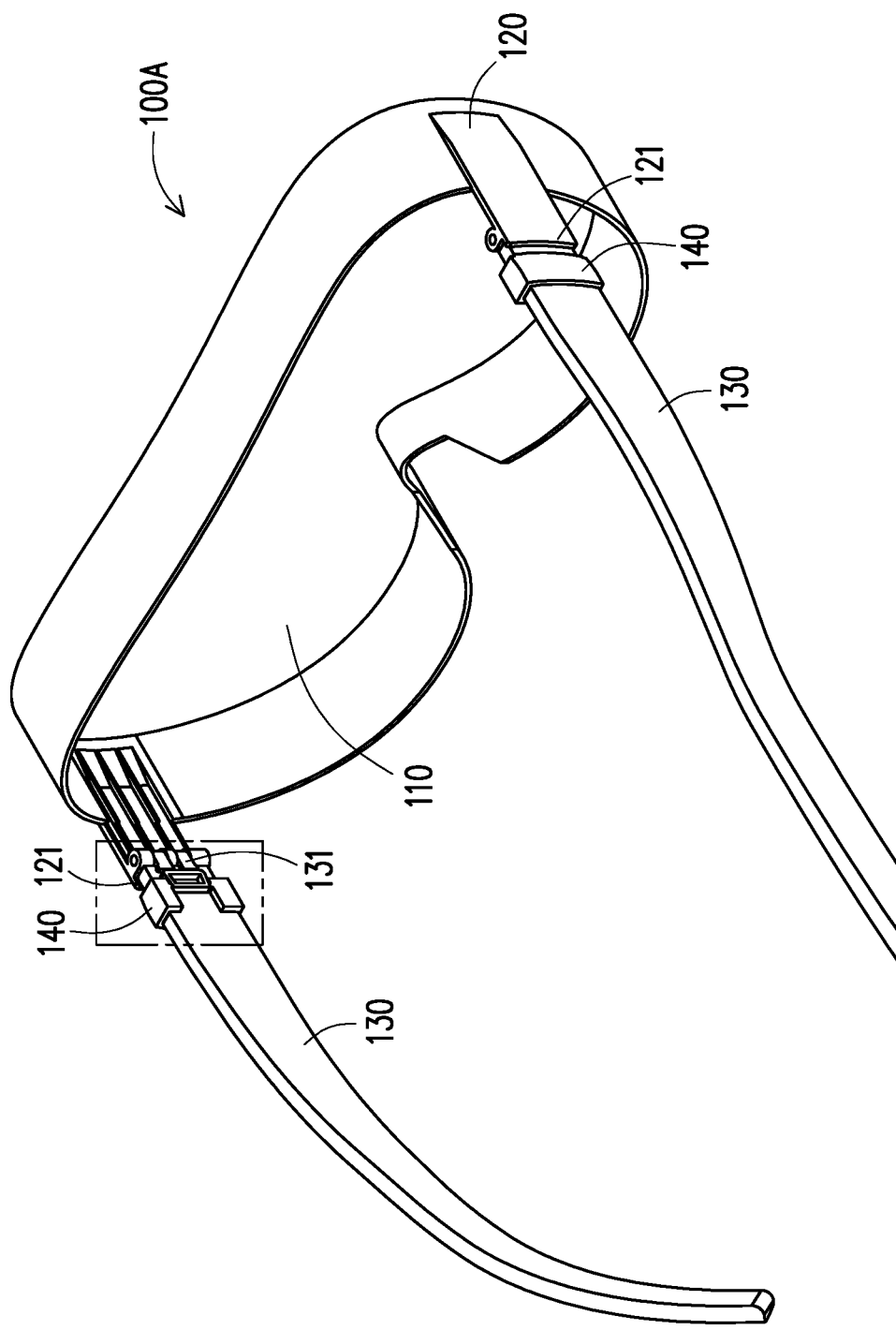
FIG. 3A is a 3D view of the head-mounted display device of FIG. 1B.
Figure 3B:
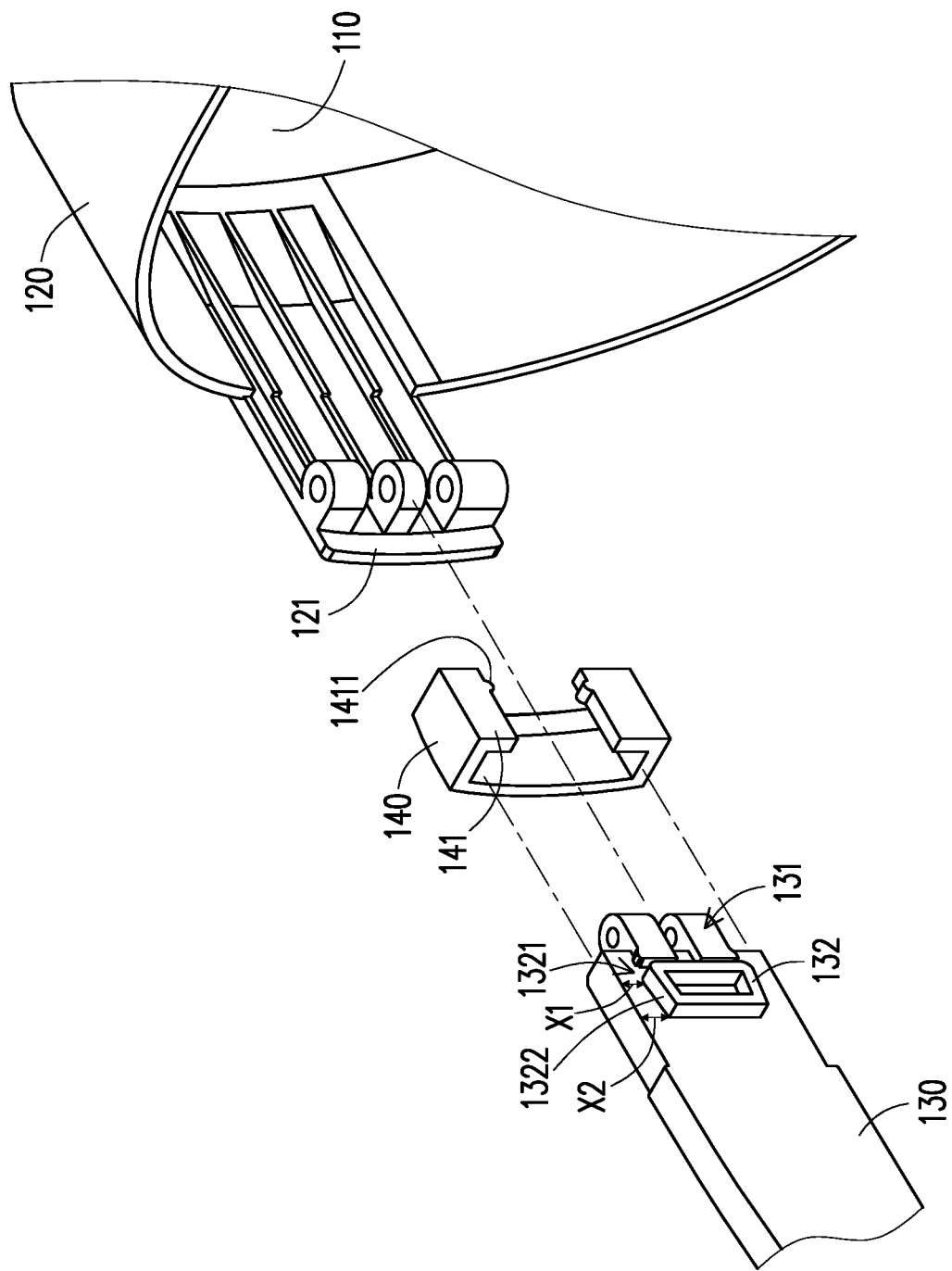
FIG. 3B is an explosion view of certain components of the head-mounted display device of FIG. 3A.
Figure 4A:
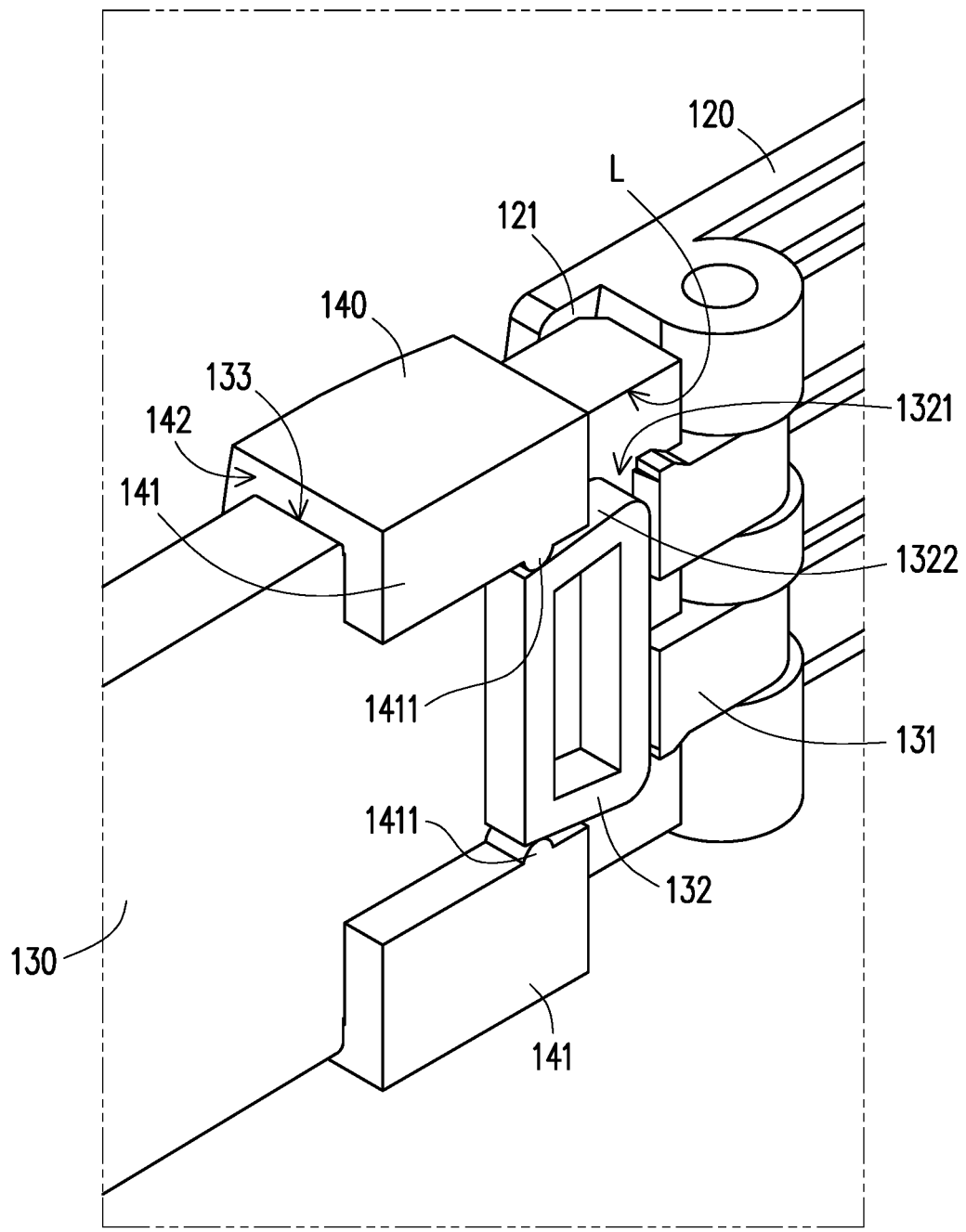
FIG. 4A and FIG. 4B are partial enlarged views of the head-mounted display device of FIG. 3A in different states, respectively.
Figure 4B:
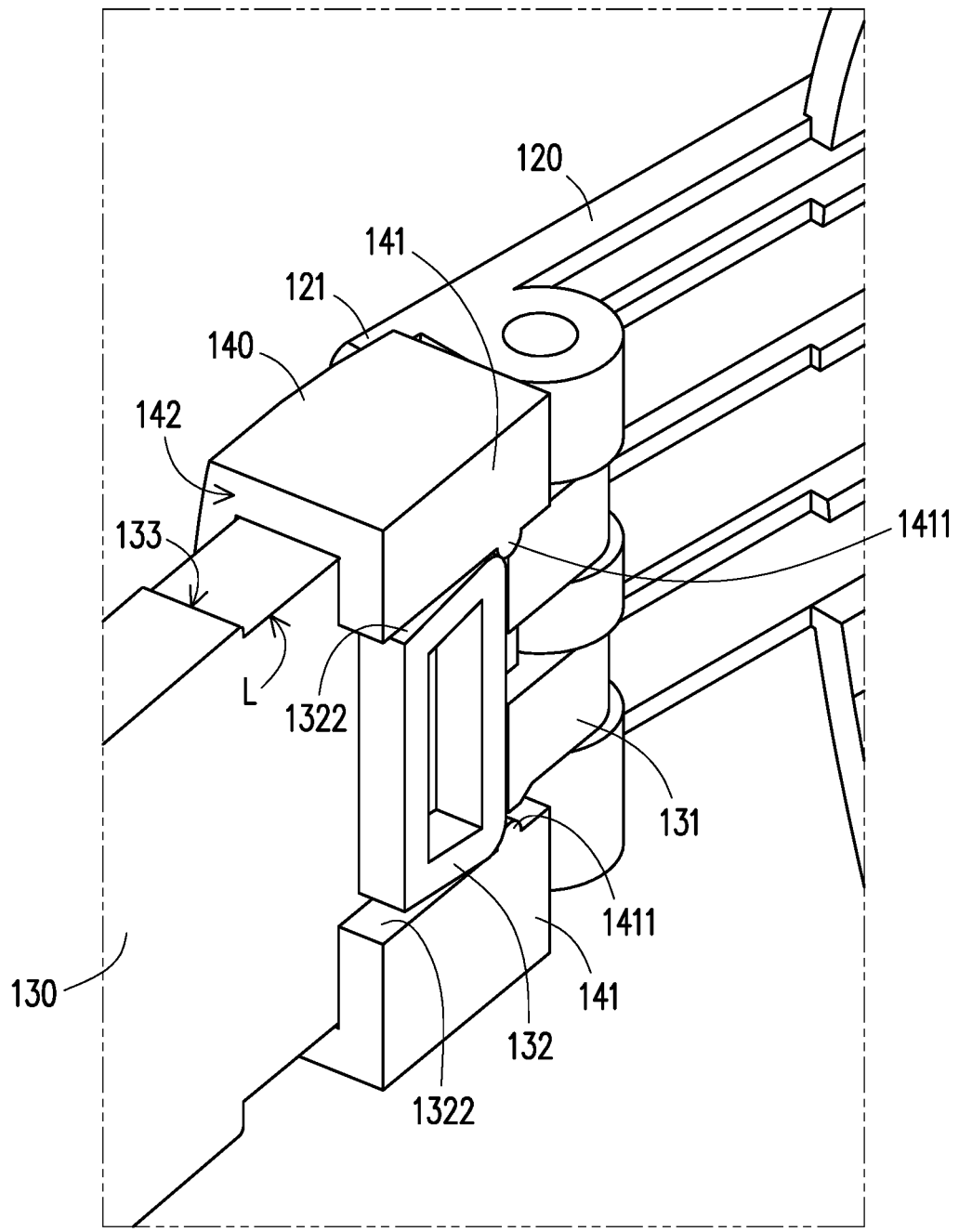
Figure 4C:
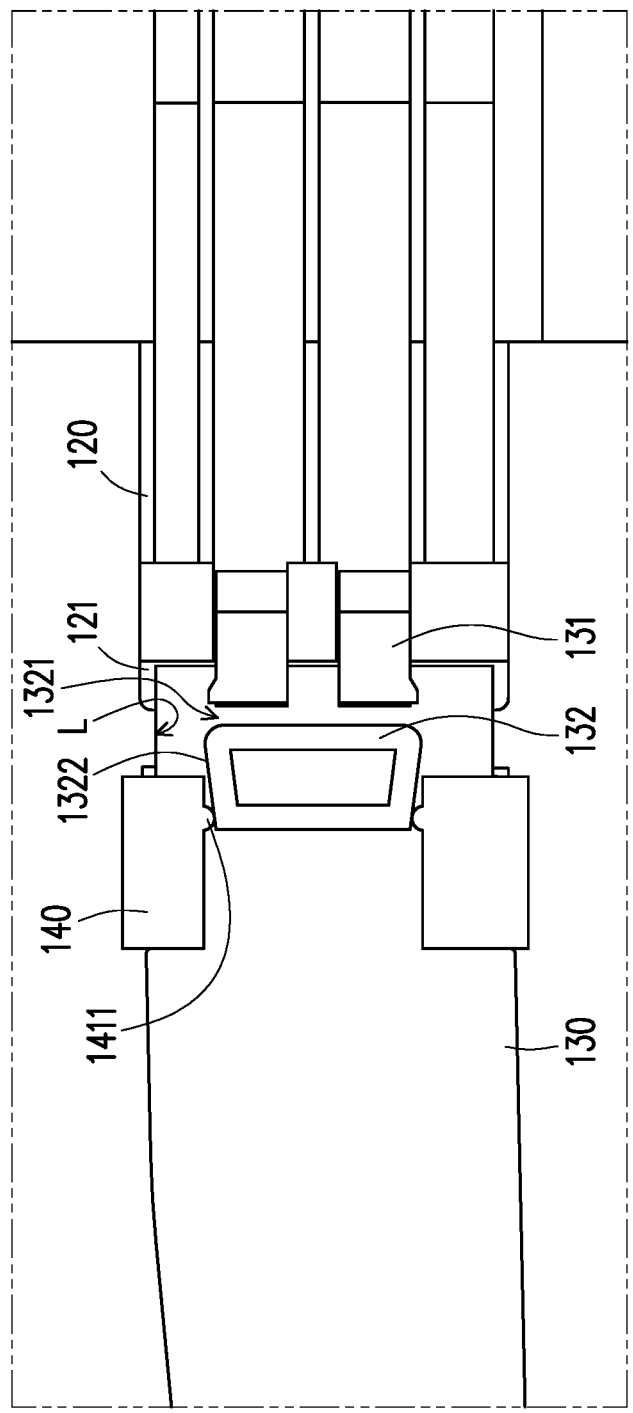
FIG. 4C and FIG. 4D are partial front views of the head-mounted display device of FIG. 4A and FIG. 4B, respectively.
Figure 4D:
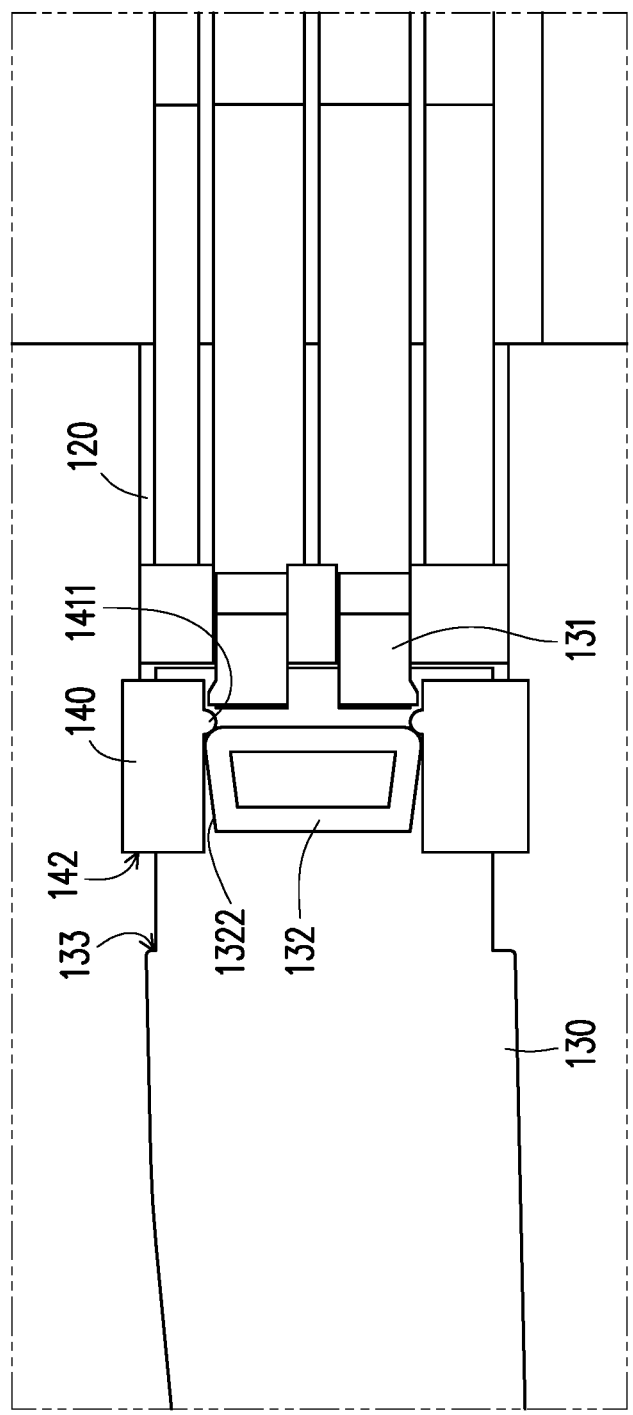

FIG. 3A is a 3D view of the head-mounted display device of FIG. 1B. FIG. 3B is an explosion view of certain components of the head-mounted display device of FIG. 3A. FIG. 4A and FIG. 4B are partial enlarged views of the head-mounted display device of FIG. 3A in different states, respectively. FIG. 4C and FIG. 4D are partial front views of the head-mounted display device of FIG. 4A and FIG. 4B, respectively. Referring to FIG. 3A, FIG. 3B, FIG. 4A and FIG. 4B, in this embodiment, the main frame 120 includes two stopping pieces 121, and each of the stopping pieces 121 extends to an outer side of the corresponding arm 130.

In details, when the adjusting piece 140 is in the first position shown by FIG. 2A, the adjusting piece 140 is located outside a space between the corresponding arm 130 and the stopping piece 121, as shown by FIG. 4A. When the adjusting piece 140 is in the second position shown by FIG. 2B, the adjusting piece 140 enters the space between the corresponding arm 130 and the stopping piece 121 to form a structural interference with the arm 130 and the stopping piece 121, as shown by FIG. 4B.

A positioning mechanism of the adjusting pieces 140 of the head-mounted display device 100A will be described below.

Referring to FIG. 3B, FIG. 4A and FIG. 4B, the adjusting piece 140 of the present embodiment includes a first positioning portion 141, and the arm 130 includes a second positioning potion 132 corresponding to the first positioning portion 141. For instance, the second portion 132 protrudes from an inner side of the corresponding arm 130 and includes a notch 1321 and a guiding surface 1322. The first positioning portion 141 includes a bump 1411 corresponding to the notch 1321. The guiding surface 1322 faces the corresponding bump 1411. Although this embodiment is described by using an example in which the first positioning portion 141 includes the bump 1411 and the second positioning portion 132 includes the notch 1321, it is also possible that the first positioning portion includes the notch and the second positioning portion includes the bump to form a bump-notch engagement in other embodiments. Alternatively, the first positioning portion and the second positioning portion respectively include magnetic pieces with different magnetism to have the adjusting piece that moves relative to the arm positioned at a specific point and prevented from being moved arbitrarily. The application is not limited to the above, and the first positioning portion and the second positioning portion may be adjusted according to actual needs.

In this embodiment, the notch 1321 is located on one end of the guiding surface 1322 close to the end portion 131 of the arm 130. Specifically, the notch 1321 is a gap formed between the second positioning portion 132 and the end portion 131 of the arm 130. However, in other embodiments, the notch 1321 may also be a recess provided on the guiding surface 1322, and it is within the scope of the present application as along as the first positioning portion 141 can be engaged with the second positioning portion 132.

In this embodiment, when the adjusting piece 140 is in the second position shown by FIG. 1C, FIG. 2B and FIG. 4B, the first positioning portion 141 forms a structural interference with the second positioning portion 132 such that each of the adjusting pieces 140 is held in the second position shown by FIG. 1C, FIG. 2B and FIG. 4B.

Referring to FIG. 3B, FIG. 4C and FIG. 4D, a first distance X1 is provided between a portion of the guiding surface 1322 close to the end portion 131 and a lateral edge L of the arm 130, a second distance X2 is provided between a portion of the guiding surface 1322 away form the end portion 131 and the lateral edge L of the arm 130, and the second distance X2 is greater than the first distance X1. In other words, the guiding surface 1322 is an inclined surface inclined to the lateral edge L of the arm 130, but the present application is not limited to the above.

Further, in a moving process of the adjusting piece 140 from the first position shown by FIG. 4A and FIG. 4C to the second position shown by FIG. 4B and FIG. 4D, the bump 1411 abuts against the guiding surface 1322 and moves along the guiding surface 1322. Meanwhile, the adjusting piece 140 is slightly deformed and the two bumps 1411 are pushed away from each other. After the bump 1411 passes the guiding surface 1322 and eventually enters the notch 1321, as the bump 1411 of the adjusting piece 140 is no longer pressed by the guiding surface 1322 to be pushed outwardly, the bump 1411 is engaged in the notch 1321.

In particular, although the above operation is described by using one first positioning portion 141 corresponding to one second positioning portion 132 as an example, there is actually a pair of the first positioning portions 141, and the second positioning portion 132 has two guiding surfaces 1322. The advantage of such a design is that the bump 1411 of the first positioning portion 141 can move more stably on the guiding surface 1322 of the second positioning portion 132 during the moving process of the adjusting piece 140, but the present application is not limited thereto.

In addition, referring to FIG. 4A and FIG. 4B, in this embodiment, the adjusting piece 140 includes a first stopping portion 142, and each of the arms 130 includes a second stopping portion 133 corresponding to the first stopping portion 142. During the moving process of the adjusting piece 140 from the second position shown by FIG. 4B toward the first position shown by FIG. 4A, the first stopping portion 142 forms a structural interference with the second stopping portion 133 to limit a moving distance of the adjusting piece 140.

Specifically, the first stopping portion 142 is a sidewall of the adjusting piece 140, and the second stopping portion 133 is a projection structure formed on the arm 130. For the adjusting piece 140, the first stopping portion 142 (the sidewall) is stopped by the second stopping portion 133 (the projection structure) to prevent the adjusting member 140 from being 97 slid on the arm 130, or even causing pressure on the two side portions of the user's head to thereby affect a wearing comfort.

In this embodiment, the first stopping portion 142 and second stopping portion 133 can have the adjusting piece 140 held in the first position shown by FIG. 4A and prevented from being moved arbitrarily. In other embodiments, for the adjusting piece 140, by disposing a notch at a portion of the second positioning portion 132 away from the end portion 131 of the arm 130 to be engaged with the bump 1411, the adjusting piece 140 may also be positioned in the first position shown by FIG. 4A, but the present application is not limited to the above.

In terms of an operation mode of the user, the user can adjust the adjusting piece 140 to the first position shown by FIG. 1B, FIG. 2A, FIG. 4A or to the second position shown by FIG. 1C, FIG. 2B, and FIG. 4B to achieve a two-stage positioning that can be adapted to head sizes for users. Therefore, the number of head sizes that the head-mounted display device 100A of the present embodiment is adapted to is at least twice that of the conventional head-mounted display device.

Other embodiments are described below to illustrate the invention more clearly. It should be noted that, the reference numerals and a part of the contents in the previous embodiment are used in the following embodiments in which identical reference numerals indicate identical or similar components, and since the adjusting pieces are additionally disposed based on the infrastructure of FIG. 1A, repeated description of the same technical contents is omitted. For a detailed description of the omitted parts, reference can be found in the previous embodiment, and no repeated description is contained in the following embodiments.

Figure 5A:
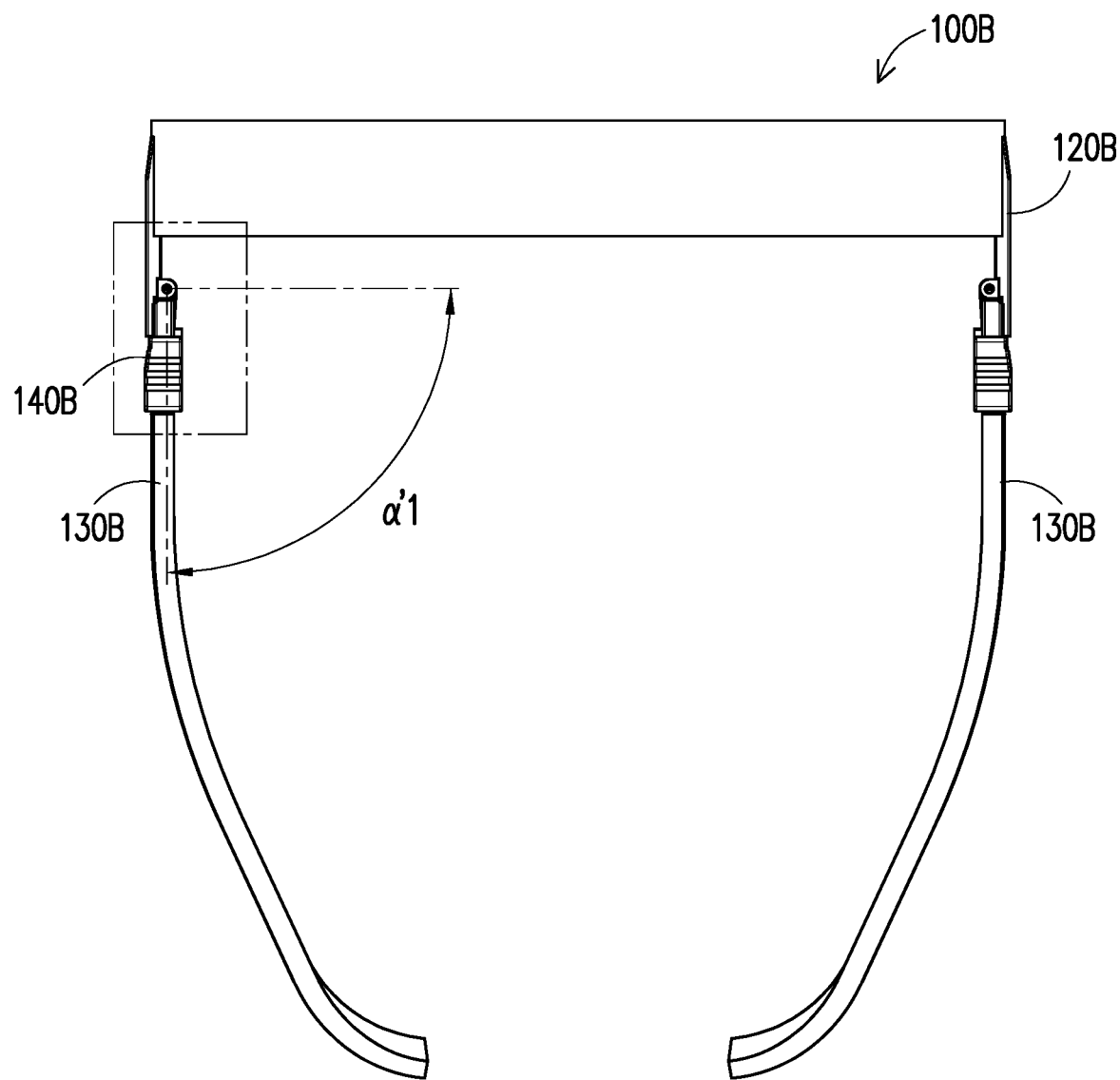
FIG. 5A to FIG. 5C are top views of a head-mounted display device according to another embodiment of the invention.
Figure 5B:
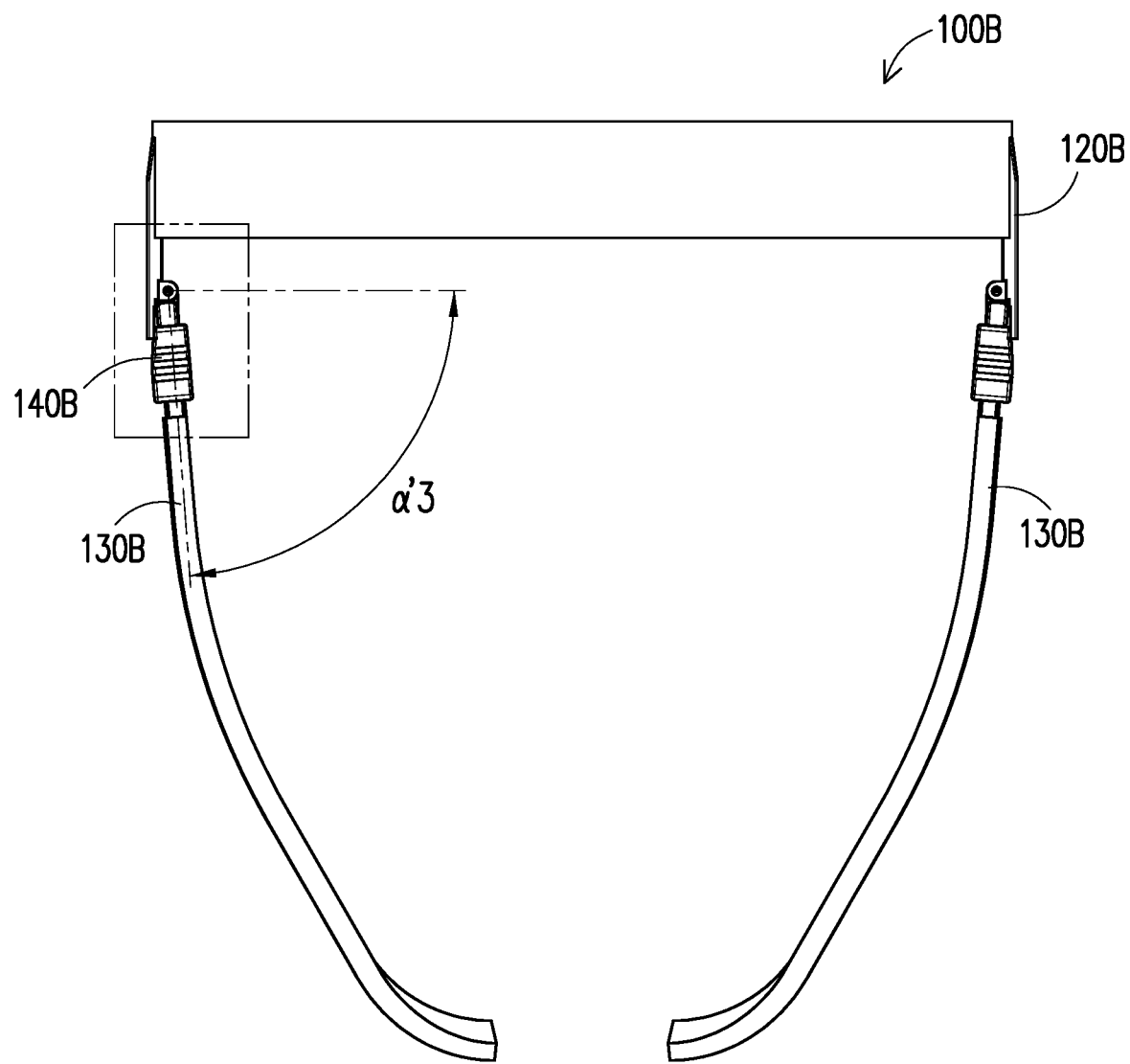
Figure 5C:
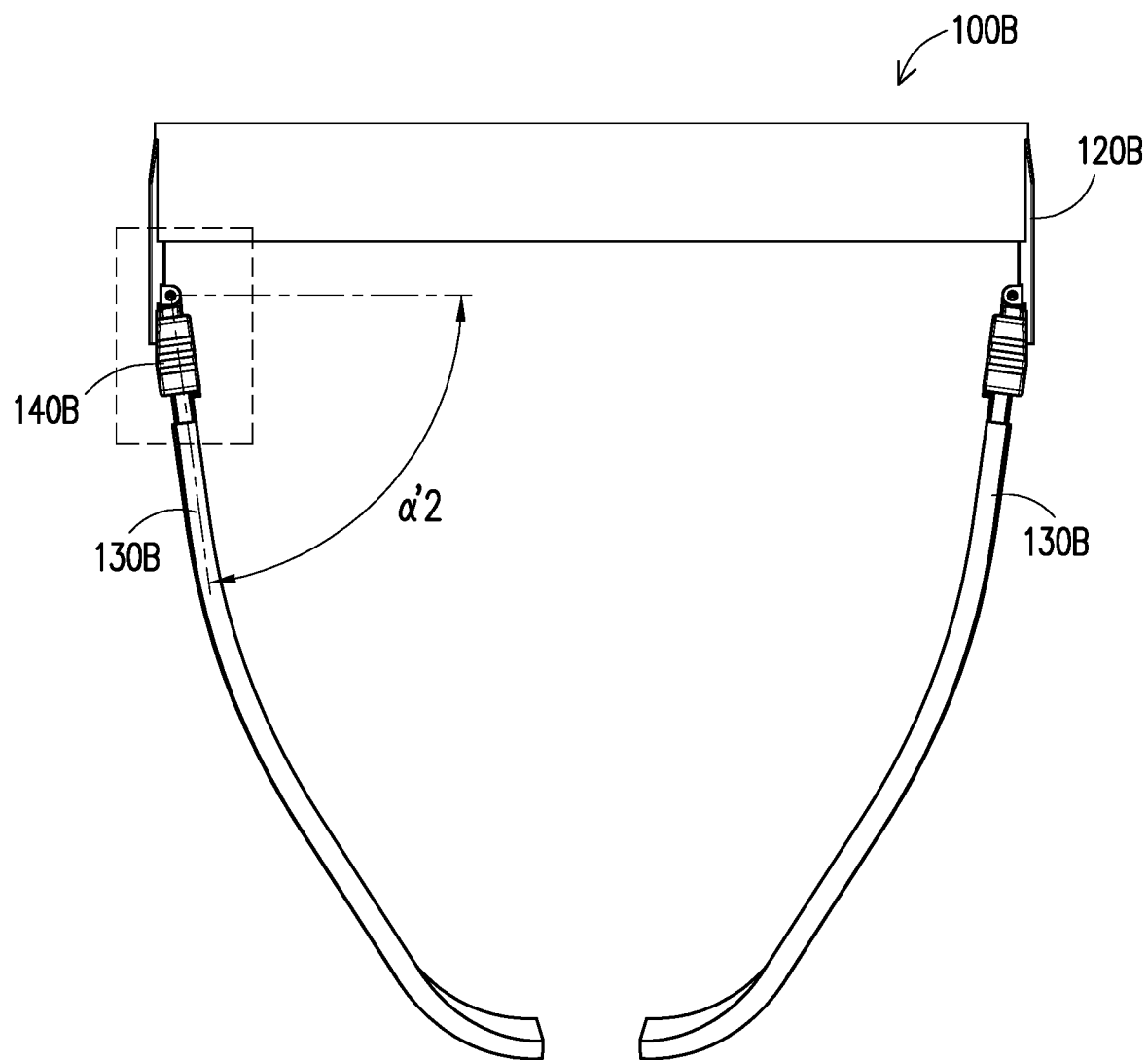
Figure 6A:
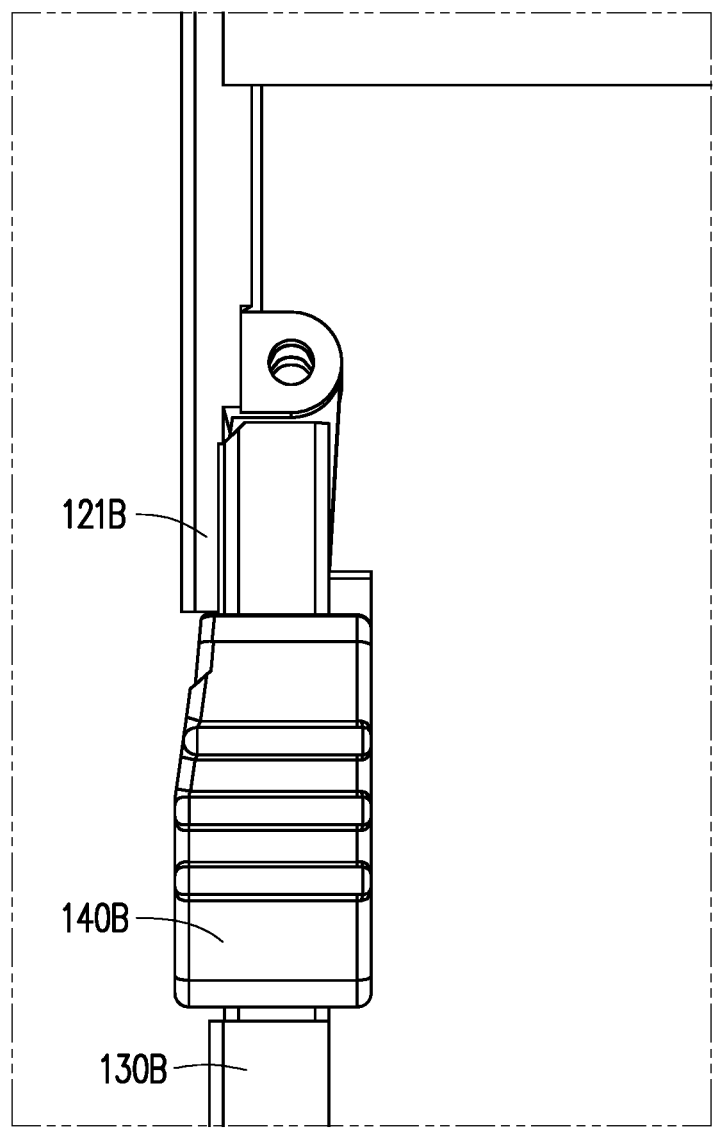
FIG. 6A to FIG. 6C are partial enlarged top views of FIG. 5A to FIG. 5C, respectively.
Figure 6B:
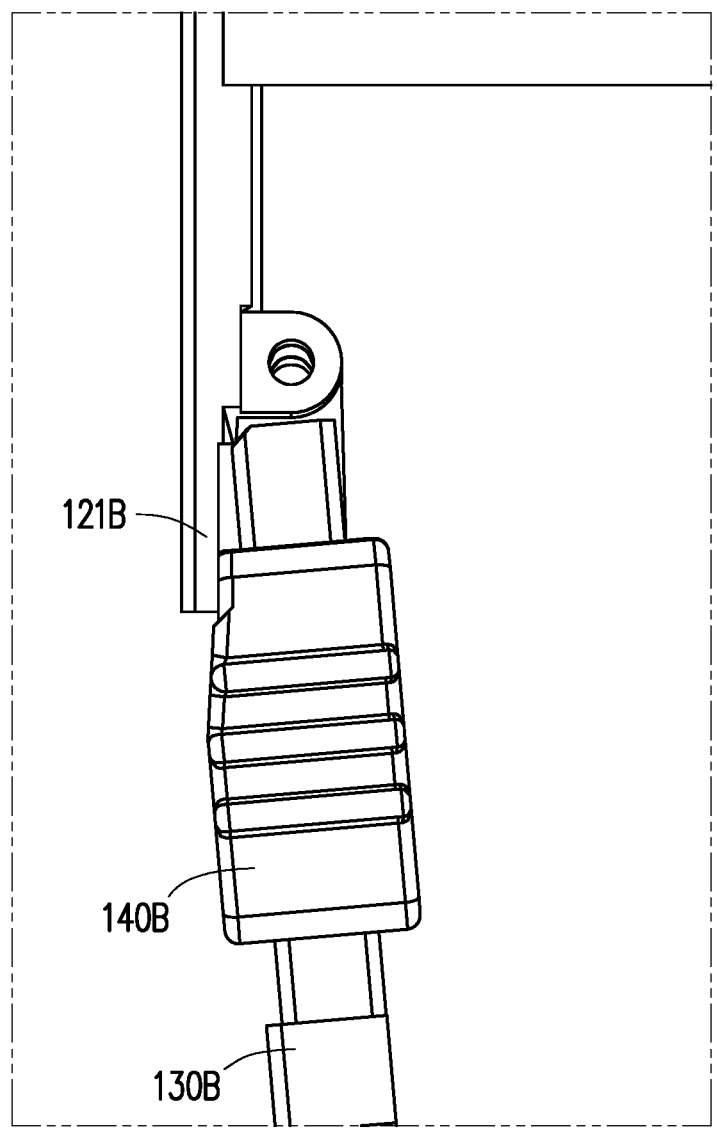
Figure 6C:
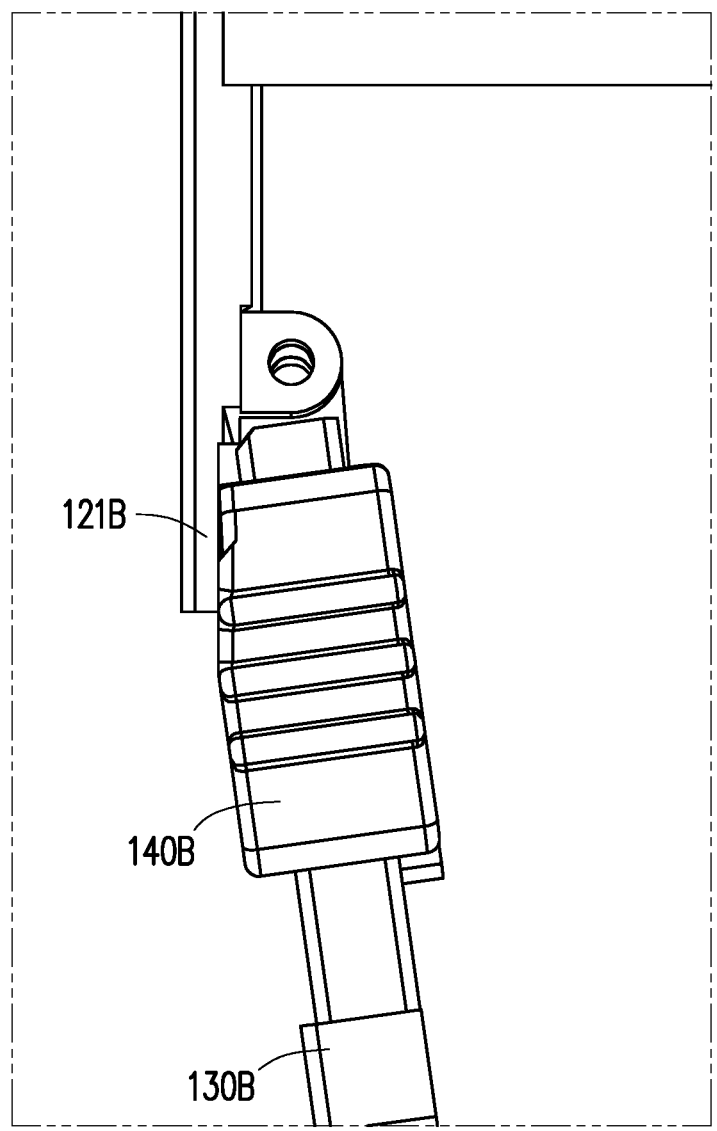
Figure 7A:
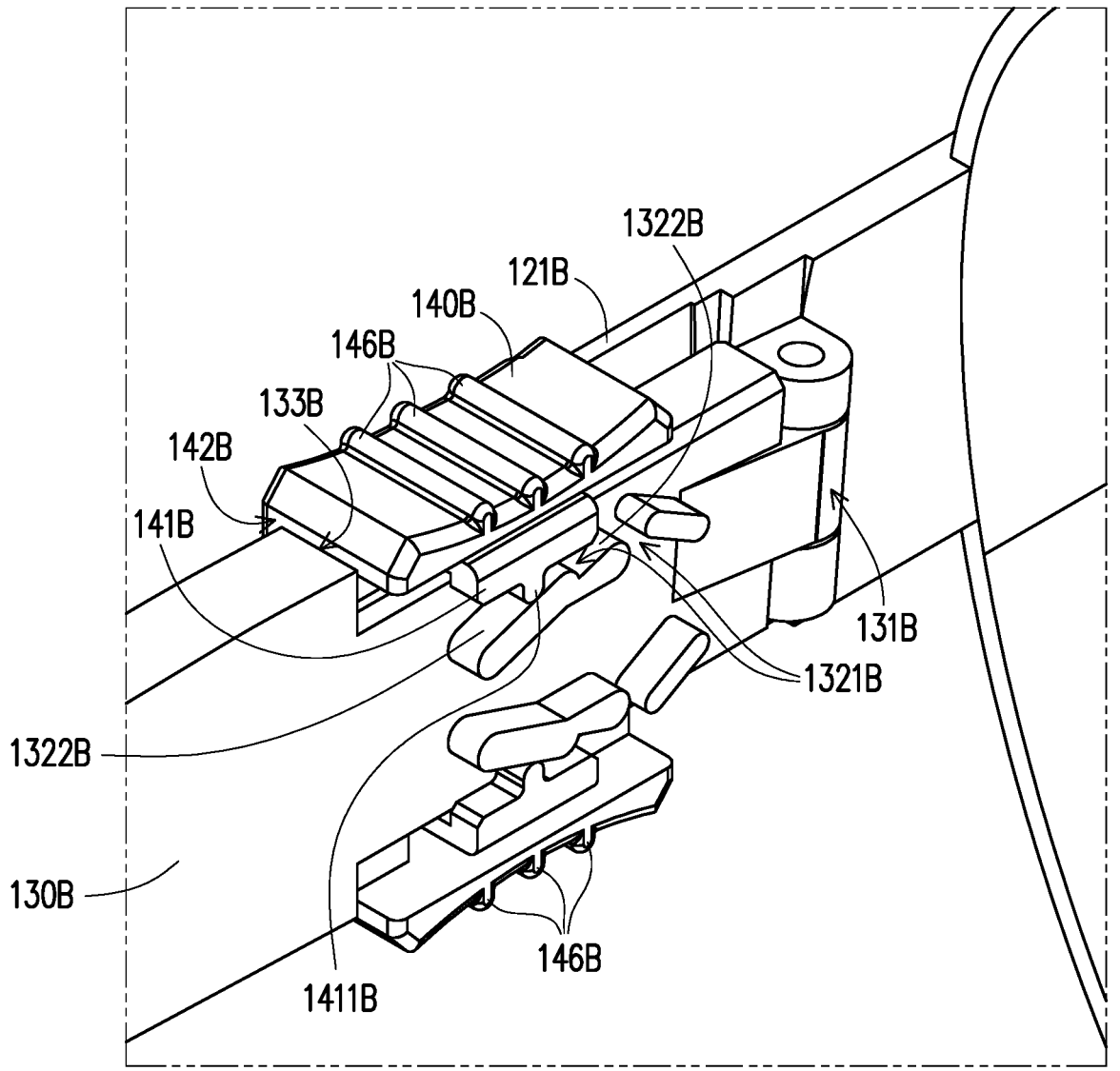
FIG. 7A to FIG. 7C are partial enlarged 3D views of FIG. 5A to FIG. 5C, respectively.
Figure 7B:
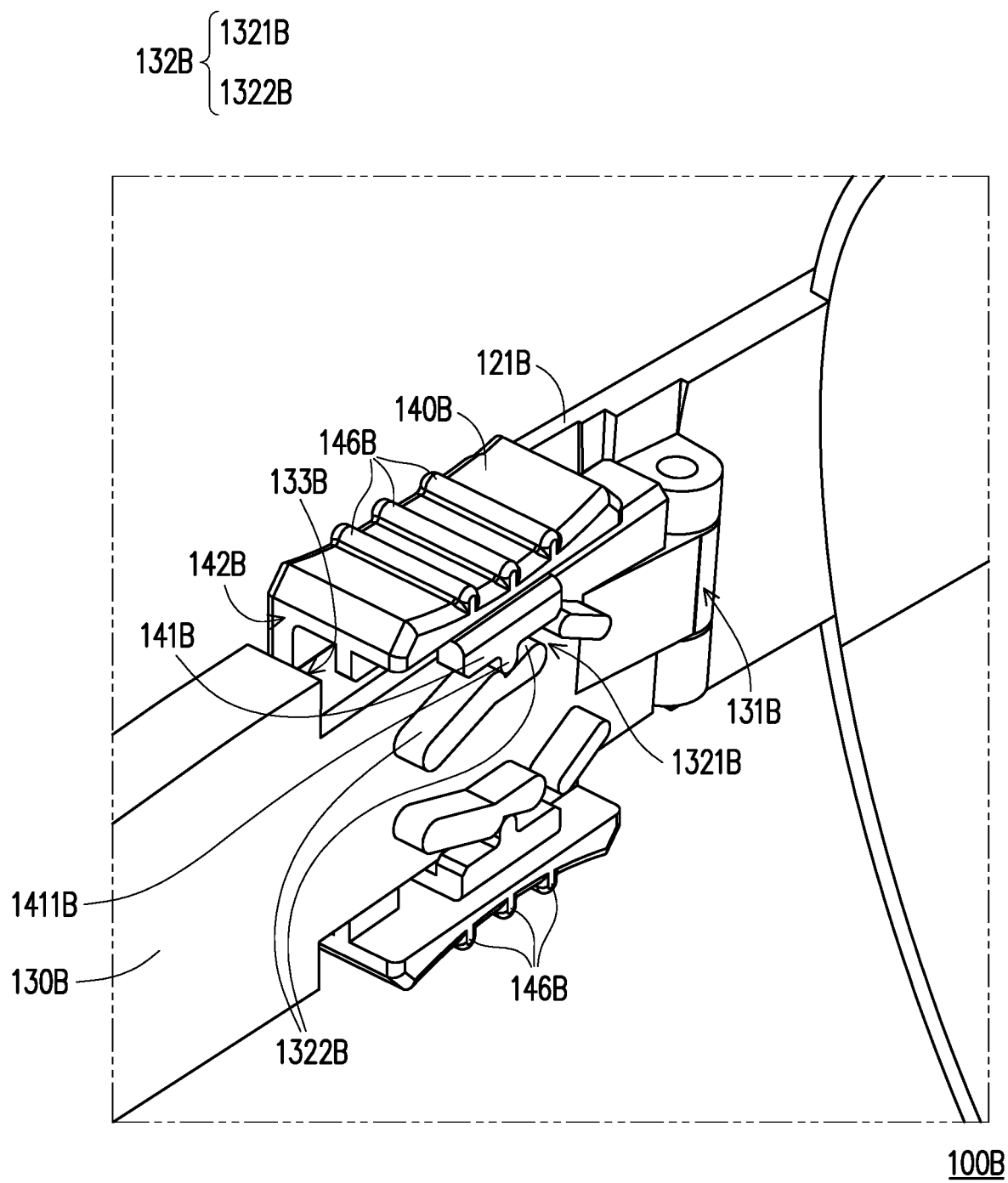
Figure 7C:
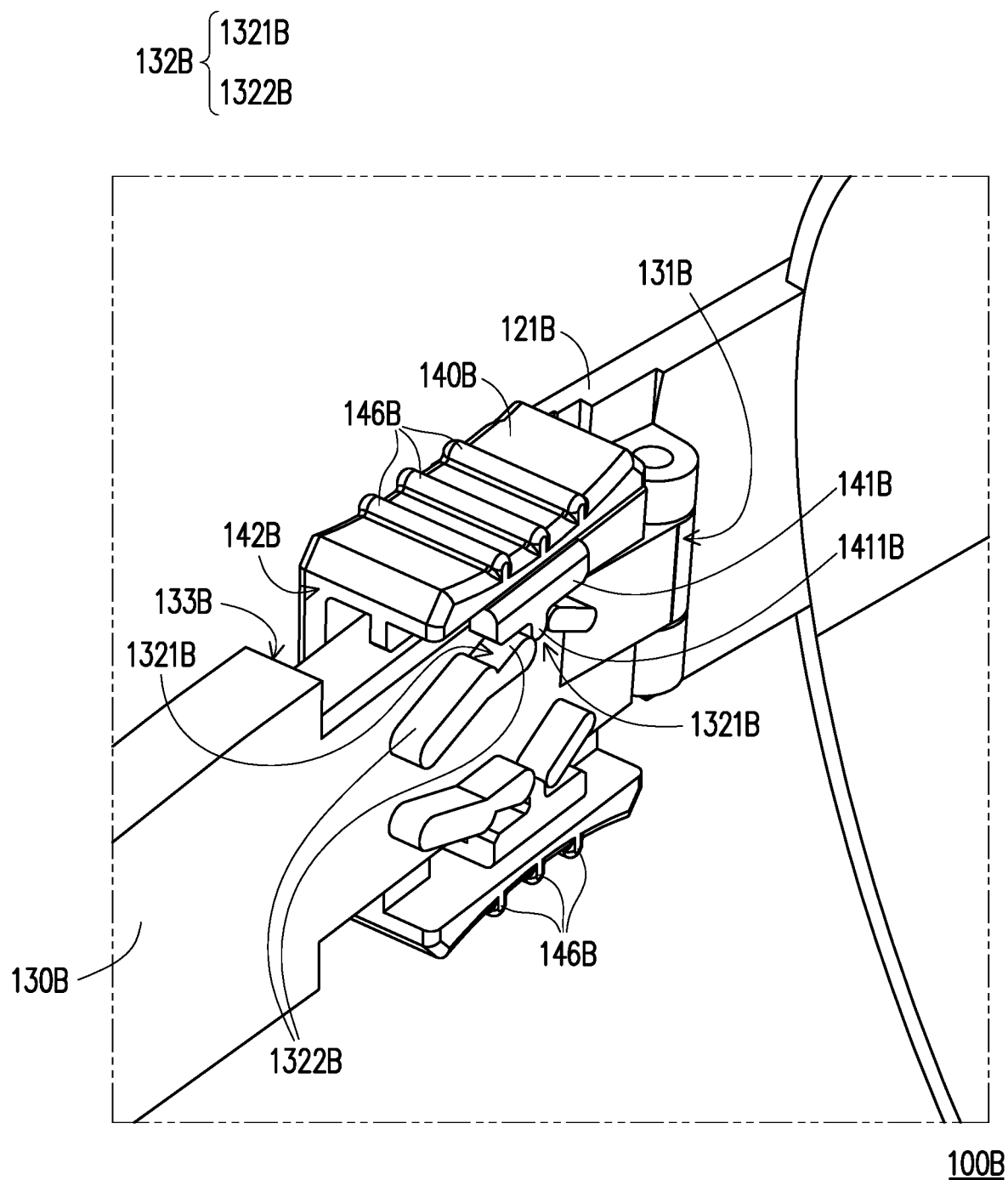
Figure 7D:
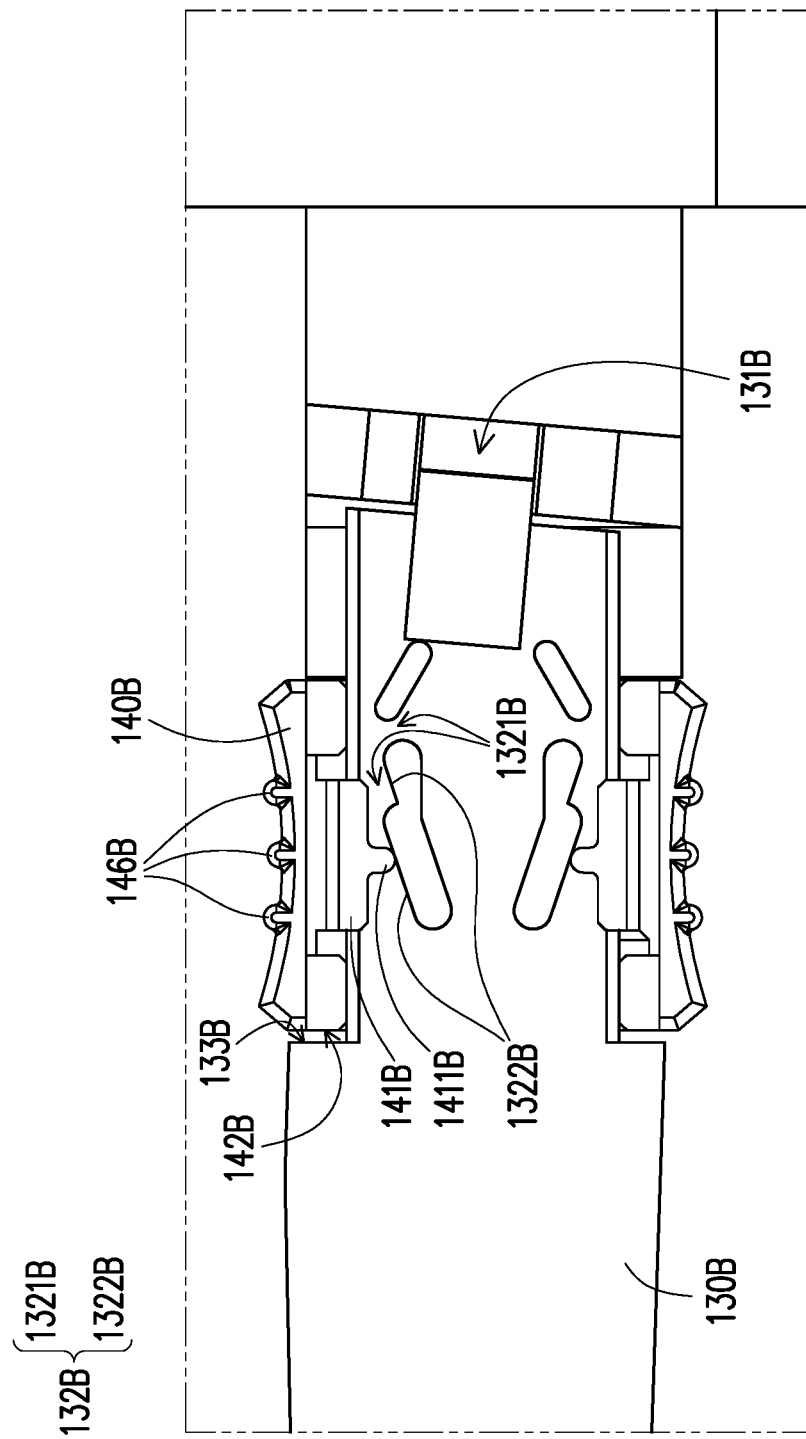
FIG. 7D to FIG. 7F are partial front views of the head-mounted display device of FIG. 7A to FIG. 7C, respectively.
Figure 7E:
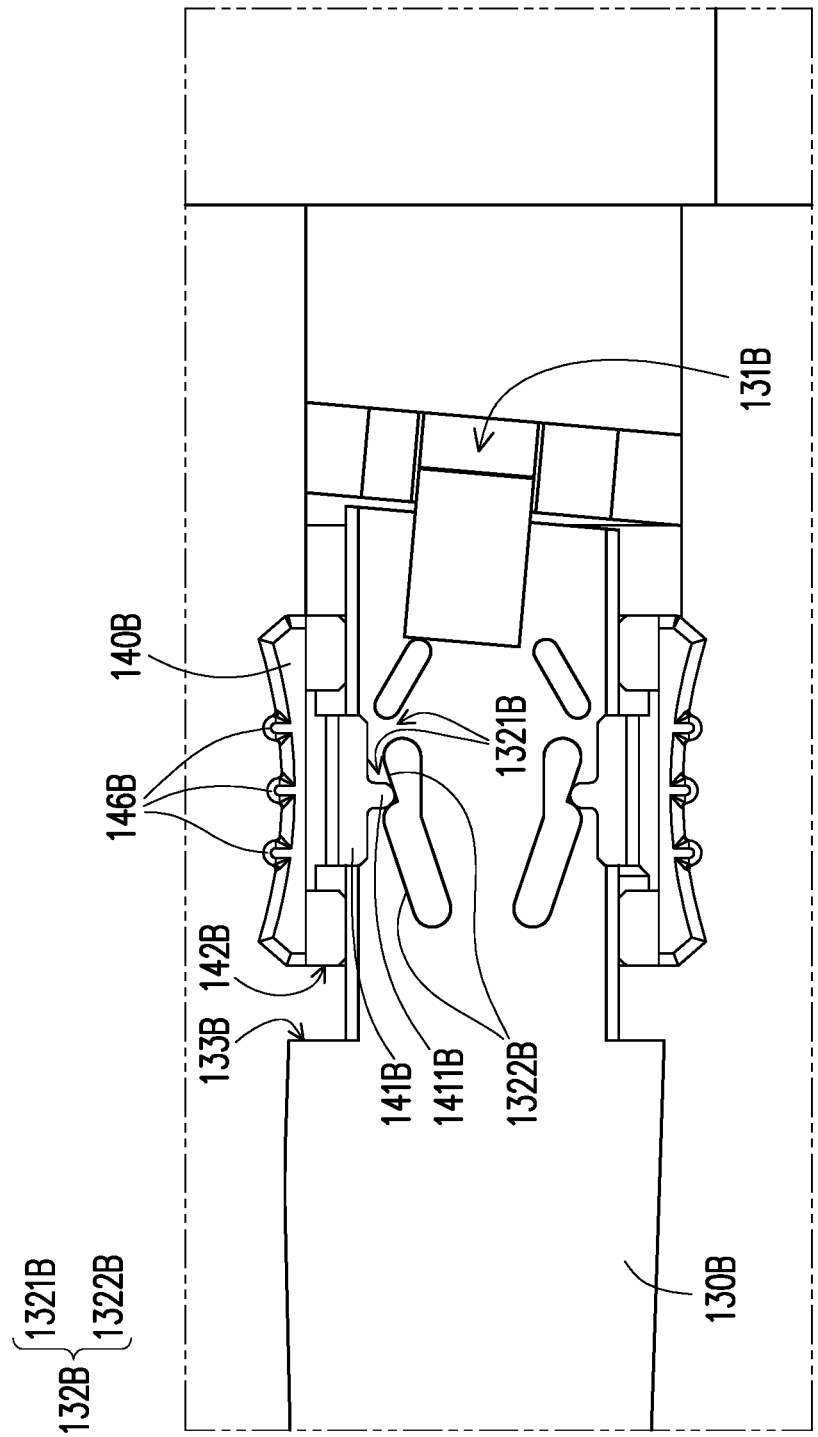
Figure 7F:
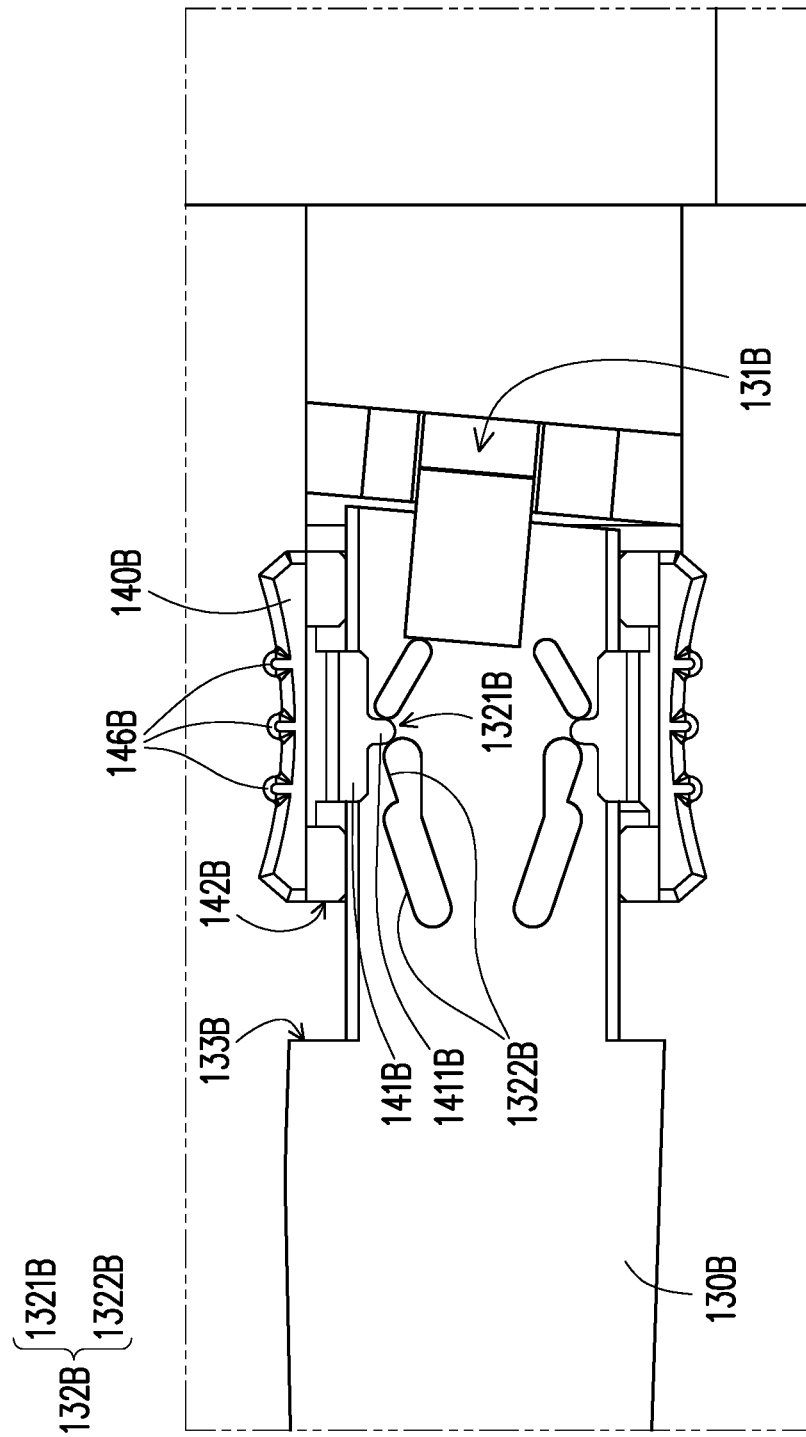

FIG. 5A to FIG. 5C are top views of a head-mounted display device according to another embodiment of the invention. FIG. 6A to FIG. 6C are partial enlarged top views of FIG. 5A to FIG. 5C, respectively. FIG. 7A to FIG. 7C are partial enlarged 3D views of FIG. 5A to FIG. 5C, respectively. FIG. 7D to FIG. 7F are partial front views of the head-mounted display device of FIG. 7A to FIG. 7C, respectively. In this embodiment, a head-mounted display device 100B is slightly different from the head-mounted display device 100A of FIG. 1B in a positioning mechanism of adjusting pieces 140B on arms 130B. The adjusting pieces 140B of the present embodiment can be positioned in three stages to achieve a three-angle adjustment.

In terms of an operation mode of the user, the user can adjust the adjusting piece 140B to move from a first position shown by FIG. 6A via a third position shown by FIG. 6B to a second position shown by FIG. 6C. When the adjusting piece 140B is in the first position shown by FIG. 6A, the adjusting piece 140B is located outside a space between the corresponding arm 130B and a stopping piece 121B such that the arm 130B can be unfolded to a first maximum angle of rotation $\alpha'1$, as shown by FIG. 5A.

When the adjusting piece 140B is in the third position shown by FIG. 6B, the adjusting piece 140 enters the space between the corresponding arm 130B and the stopping piece 121B and forms a structural interference with the arm 130B and the stopping piece 121B. Meanwhile, the arm 130B can be unfolded to a third maximum angle of rotation $\alpha'3$, as shown by FIG. 5B.

Similarly, when the adjusting piece 140B is in the second position shown by FIG. 6C, the adjusting piece 140 enters the space between the corresponding arm 130B and the stopping piece 121B more deeply to from the structural interference with the arm 130B and the stopping piece 121B such that the arm 130B can be unfolded to a second maximum angle of rotation $\alpha'2$, as shown by FIG. 5C. In this embodiment, the third maximum angle of rotation $\alpha'3$ is between the second maximum angle of rotation $\alpha'2$ and the first maximum angle of rotation $\alpha'1$. Therefore, by adjusting the position of the adjusting piece 140B the head-mounted display device 100B of the present embodiment can achieve a three-stage positioning for adjusting the wearing space so the head-mounted display device 100B can be adapted to head sizes for different users and can maintain its clamping force.

The positioning mechanism of the adjusting pieces 140B of the head-mounted display device 100B will be described below.

Referring to FIG. 7A to FIG. 7F, in this embodiment, a second positioning portion 132B protrudes from an inner side of the corresponding arm 130B. In particular, the second positioning portion 132B includes two notches 1321B and two guiding surfaces 1322B. A first positioning portion 141B includes a bump 1411B corresponding to the notches 1321B. The guiding surfaces 1322B face the corresponding bump 1411B, and the guiding surfaces 1322B and the notches 1321B are alternately arranged.

During a moving process of the adjusting piece 140B from the first position shown by FIG. 7A and FIG. 7D via the third position shown by FIG. 7B and FIG. 7E to the second position shown by FIG. 7C and FIG. 7F, the first positioning portion 141B can form a structural interference with the second positioning portion 132B. In other words, the bump 1411B can sequentially abut against the guiding surfaces 1322B and move along the guiding surfaces 1322B to enter the corresponding notches 1321B, and the bump 1411B can then be engaged in the corresponding notches 1321B such that the adjusting piece 140B is held in the third position shown by FIG. 7B and FIG. 7E, or in the second position shown by FIG. 7C and FIG. 7F.

Although the above operation is described by using one first positioning portion 141B corresponding to one second positioning portion 132B as an example, there are actually a pair of the first positioning portions 141B and a pair of the second positioning portions 132B. The advantage of such a design is that the bump 1411B of each of the first positioning portions 141B can move more stably on the guiding surface 1322B of the corresponding second positioning portion 132B during the moving process of the adjusting piece 140B, but the present application is not limited thereto.

Although this embodiment is described by using an example in which the first positioning portion 141B includes the bump 1411B and the second positioning portion 132B includes the notches 1321B, it is also possible that the first positioning portion includes the notches and the second positioning portion includes the bump to form a bump-notch engagement in other embodiments. The application is not limited to the above, and the first positioning portion and the second positioning portion may be adjusted according to actual needs.

In other embodiments, the number of the notches 1321B and the guiding surfaces 1322B alternately arranged is not limited to the above, and it is within the scope of the present application as along as the adjusting piece 140B can be positioned in multiple stages to achieve a multi-angle adjustment.

Referring to FIG. 7A to FIG. 7C, in this embodiment, the adjusting piece 140B includes protruding ribs 146B. The protruding ribs 146B protrude from an upper side and a lower side of the adjusting piece 140B, and configured for the user to grip and push the adjusting piece 140B with the index finger and the thumb. Naturally, in other embodiments, the number and the type of the protruding ribs 146B are not limit to those illustrated in FIG. 7A to FIG. 7C.

In addition, in this embodiment, the adjusting piece 140B includes a first stopping portion 142B, and each of the arms 130B includes a second stopping portion 133B corresponding to the first stopping portion 142B. During a moving process of the adjusting piece 140B from the second position shown by FIG. 7C and FIG. 7F toward the first position shown by FIG. 7A and FIG. 7D, the first stopping portion 142B forms a structural interference with the second stopping portion 133B to limit a moving distance of the adjusting piece 140B. However, the present application is not limited to the above.

In this embodiment, the first stopping portion 142B and the second stopping portion 133B can have the adjusting piece 140B held in the first position shown by FIG. 7A and FIG. 7D and prevented from being moved arbitrarily. In other embodiments, for the adjusting piece 140B, by disposing a notch at a portion of the second positioning portion 132B away from an end portion 131B of the arm 130B to be engaged with the bump 1411B, the adjusting piece 140B may also be positioned at the first position shown by FIG. 7A and FIG. 7D, but the present application is not limited to the above.

Figure 8A:
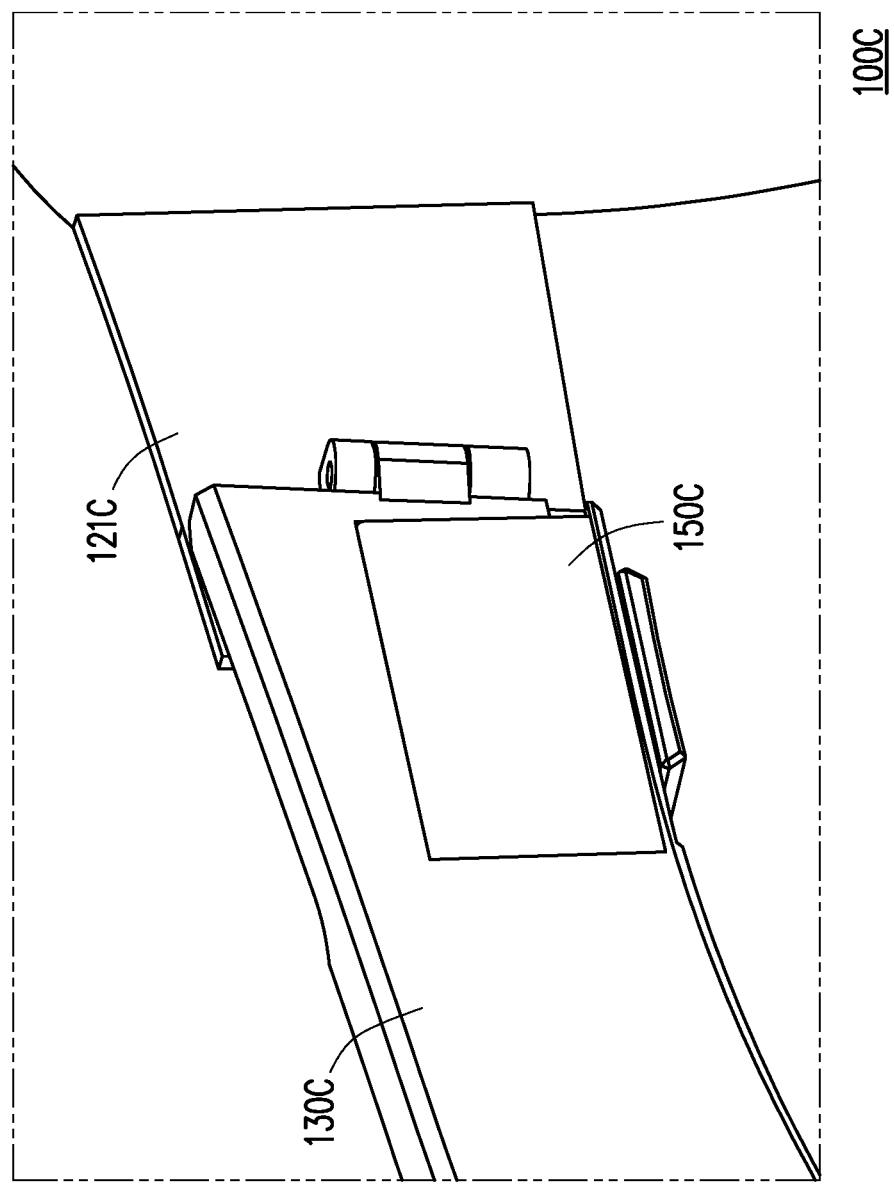
FIG. 8A is a 3D view of a head-mounted display according to another embodiment of the invention.
Figure 8B:
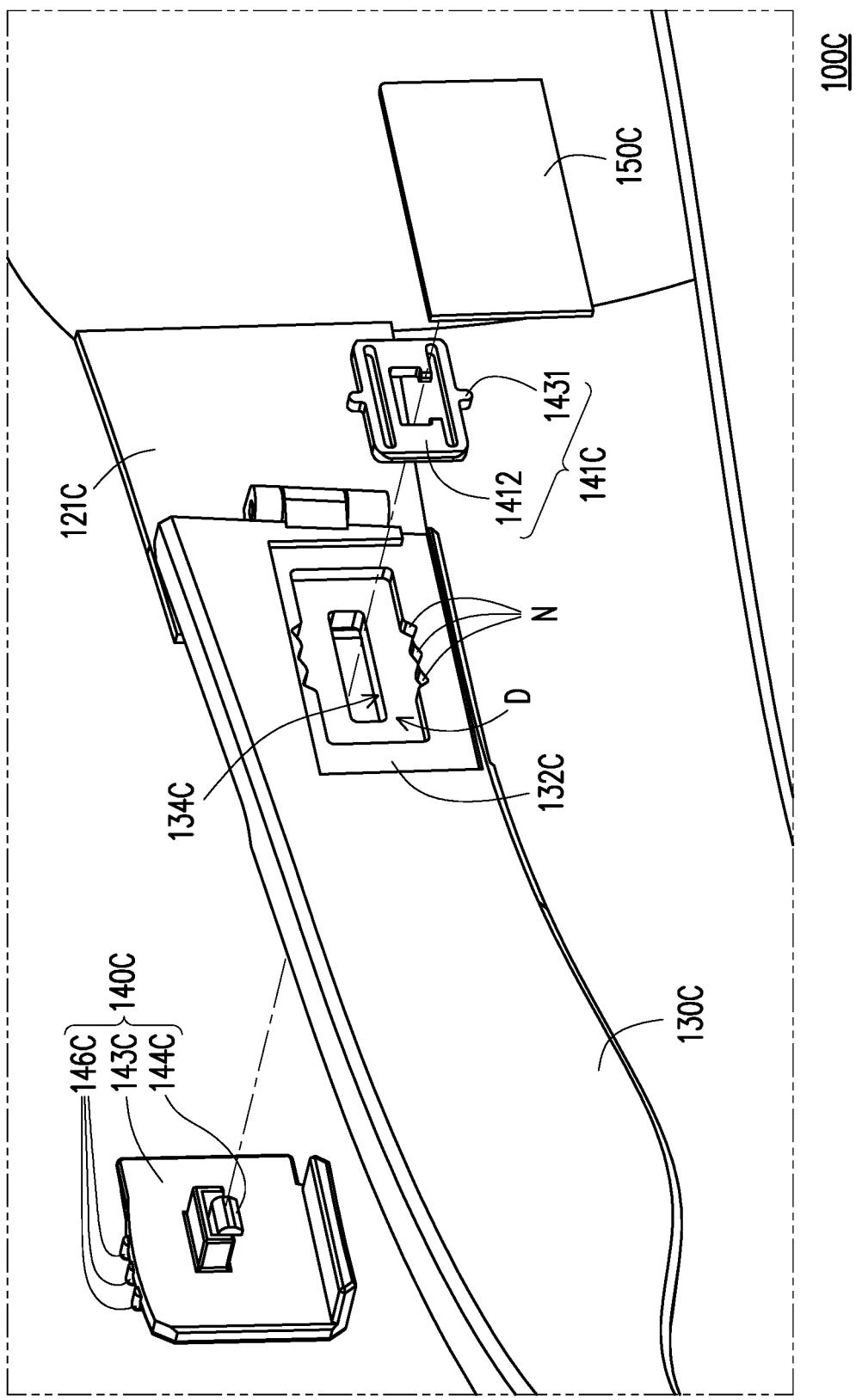
FIG. 8B is a partial explosion view of the head-mounted display device of FIG. 8A.
Figure 9A:
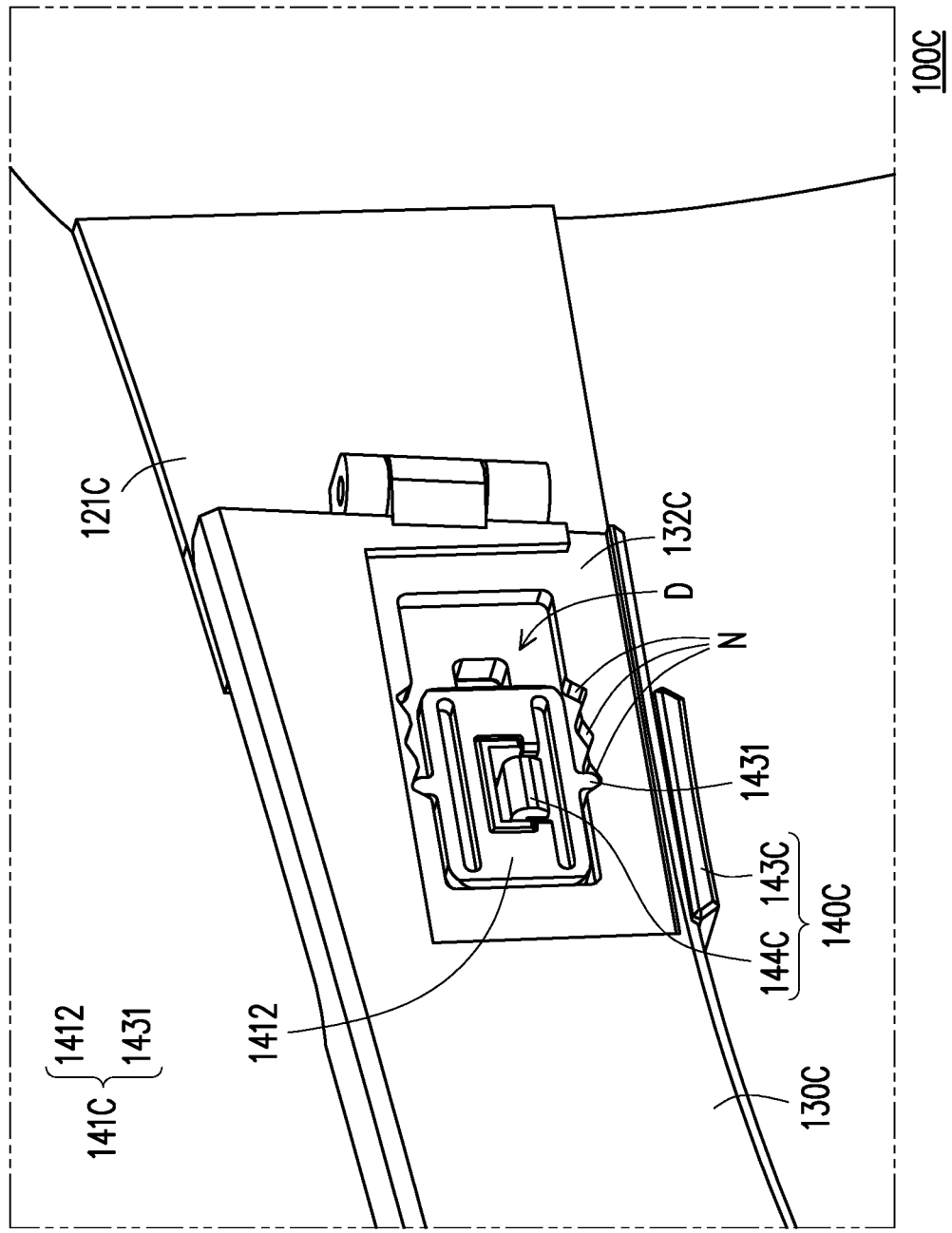
FIG. 9A to FIG. 9C are 3D views of the head-mounted display device of FIG. 8A in different states.
Figure 9B:
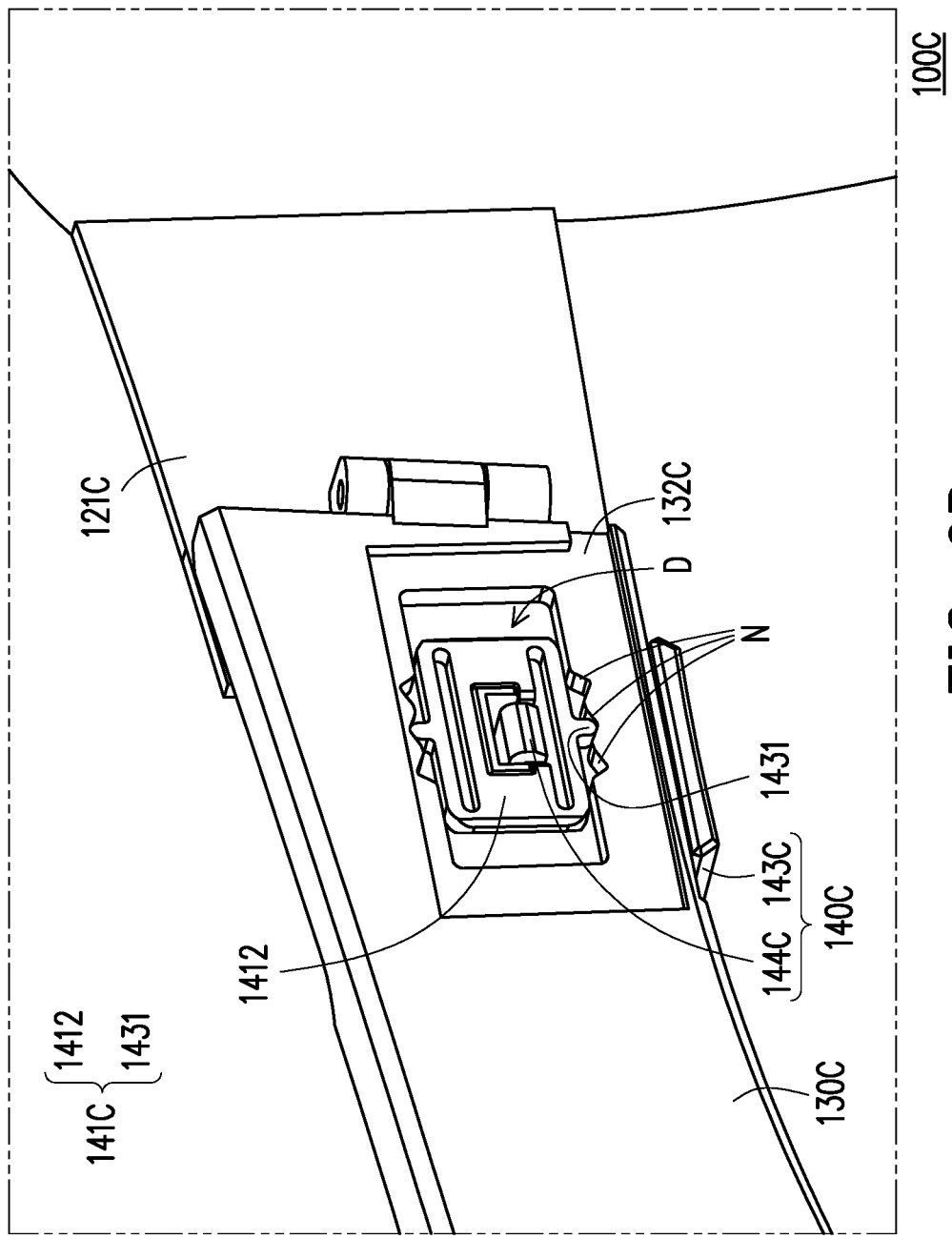
Figure 9C:
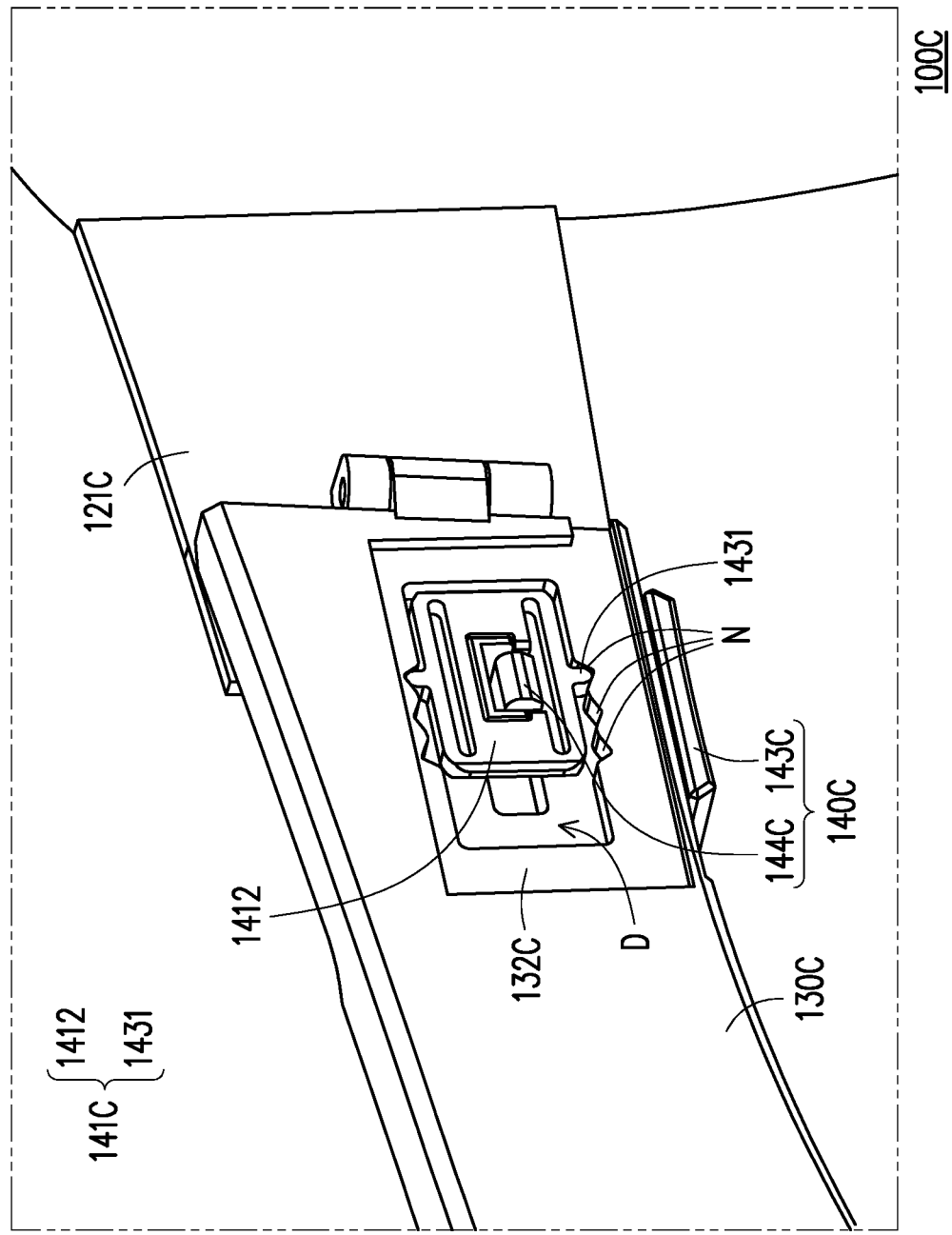
Figure 9D:
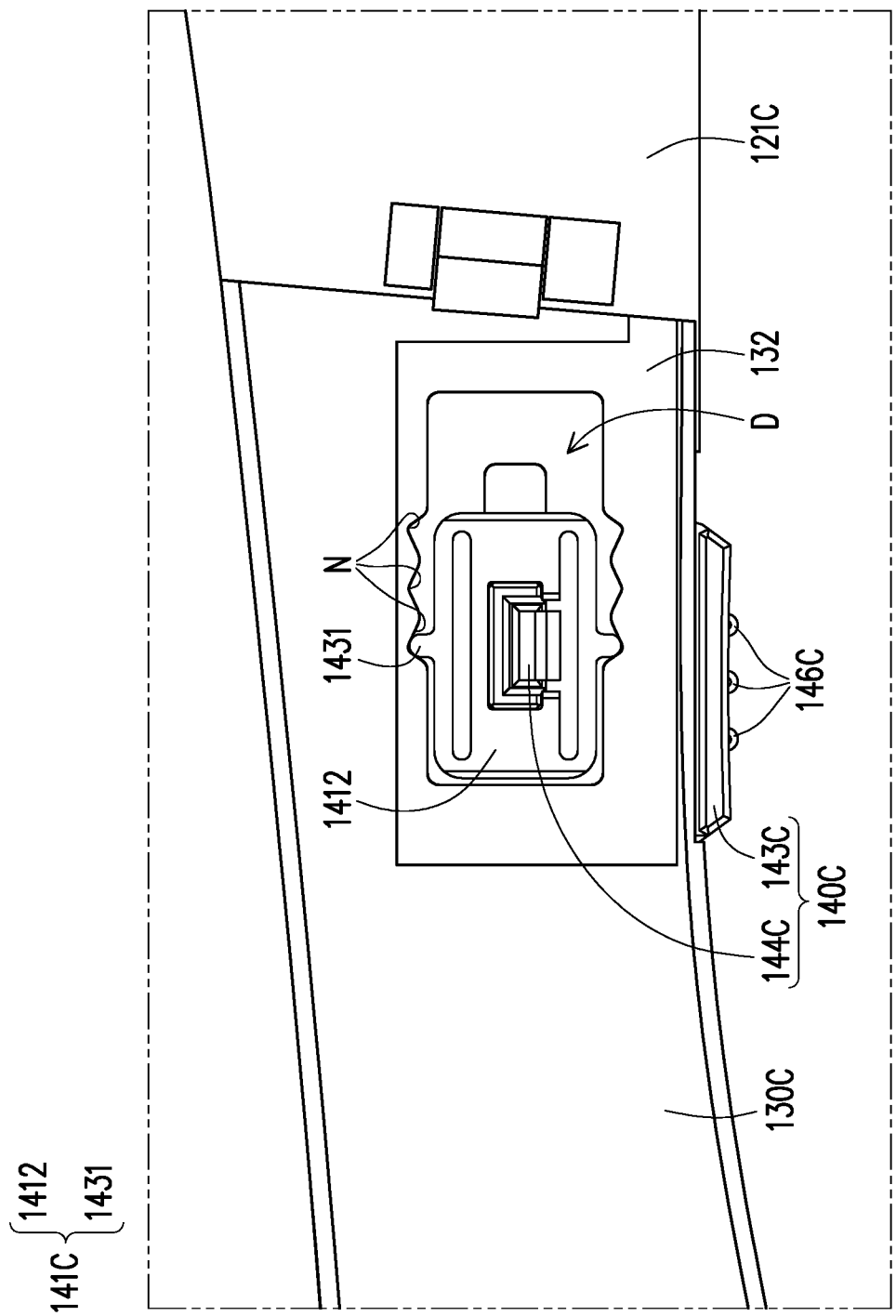
FIG. 9D to FIG. 9F are partial front views of the head-mounted display device of FIG. 9A to FIG. 9C, respectively.
Figure 9E:
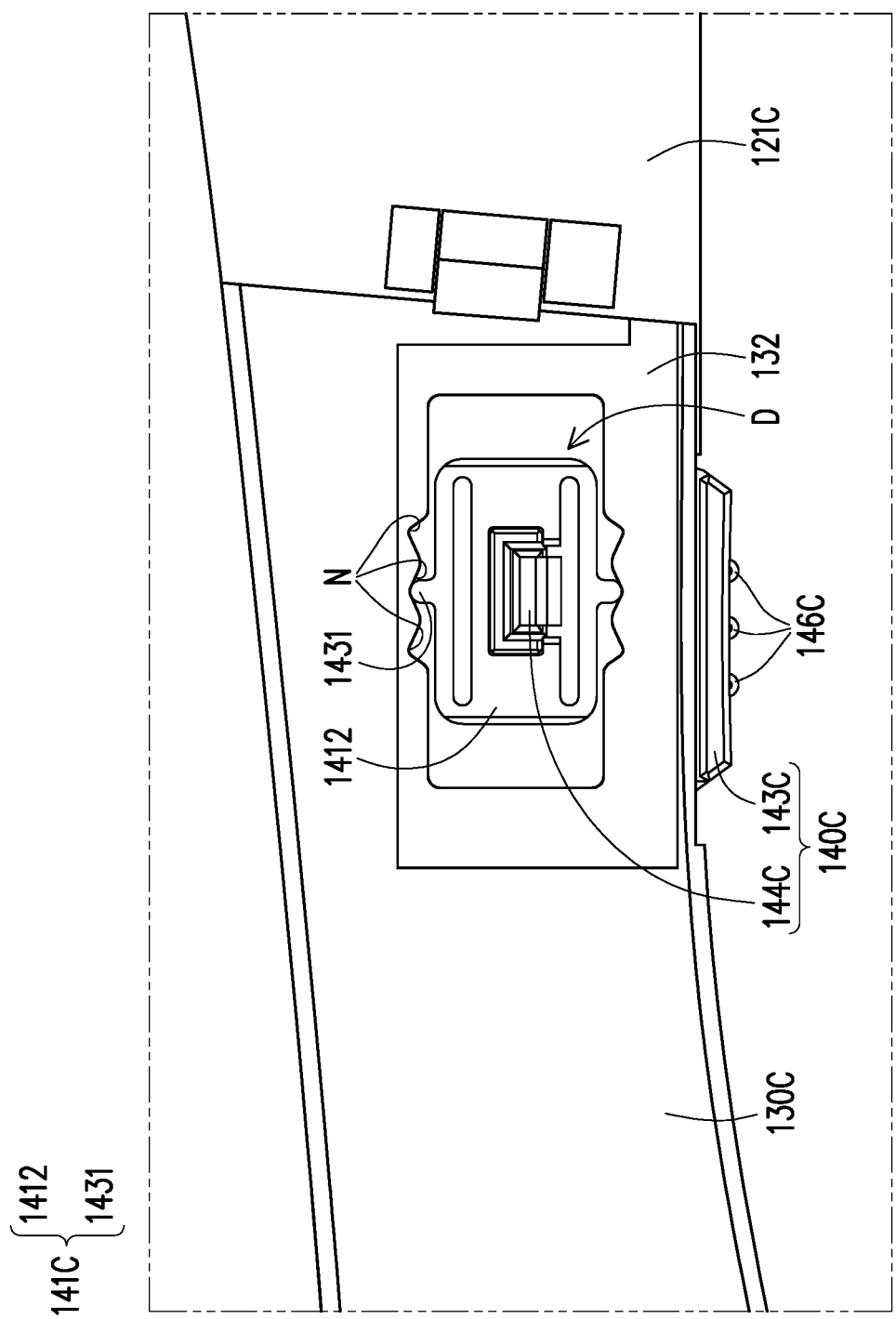
Figure 9F:
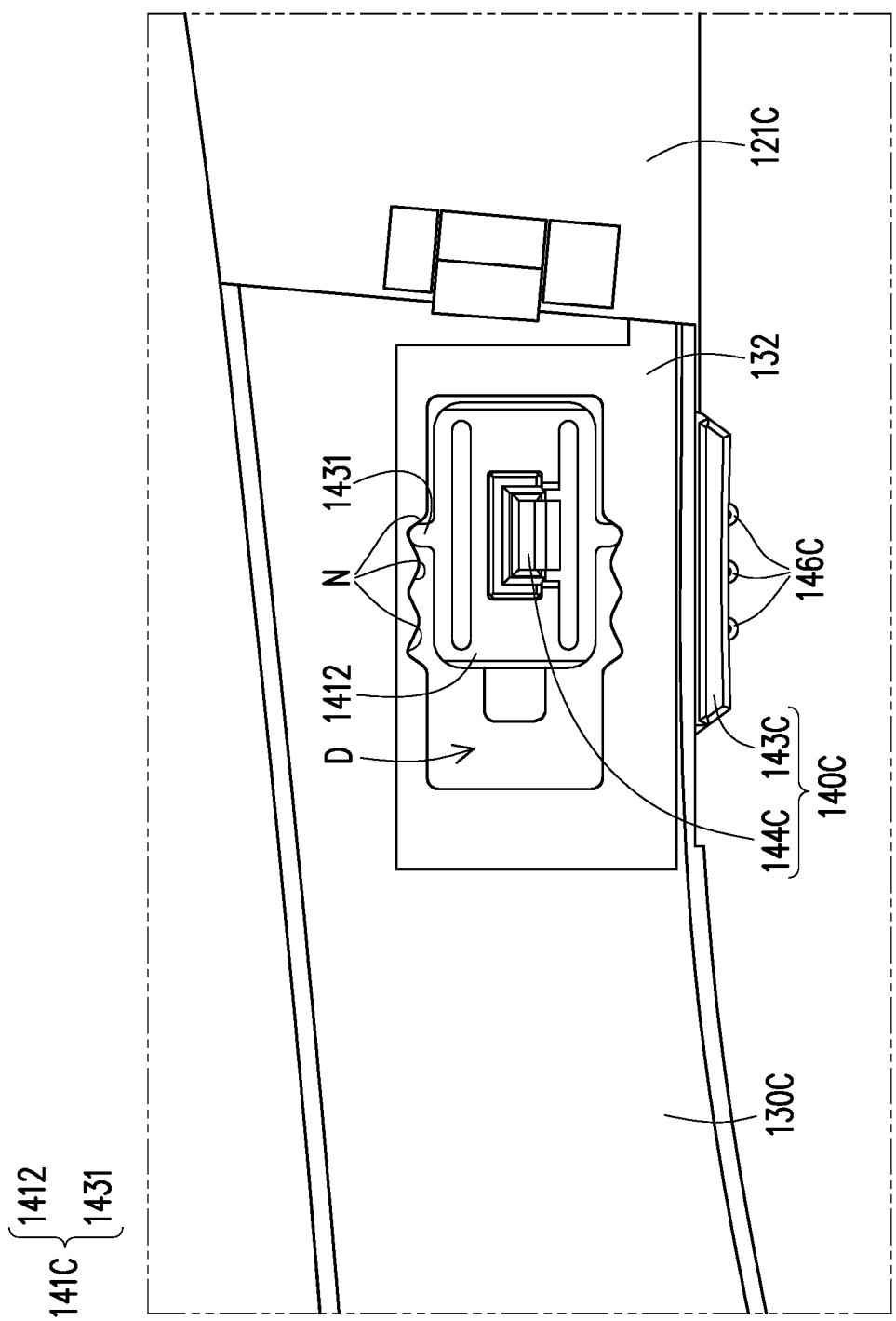
Figure 10A:
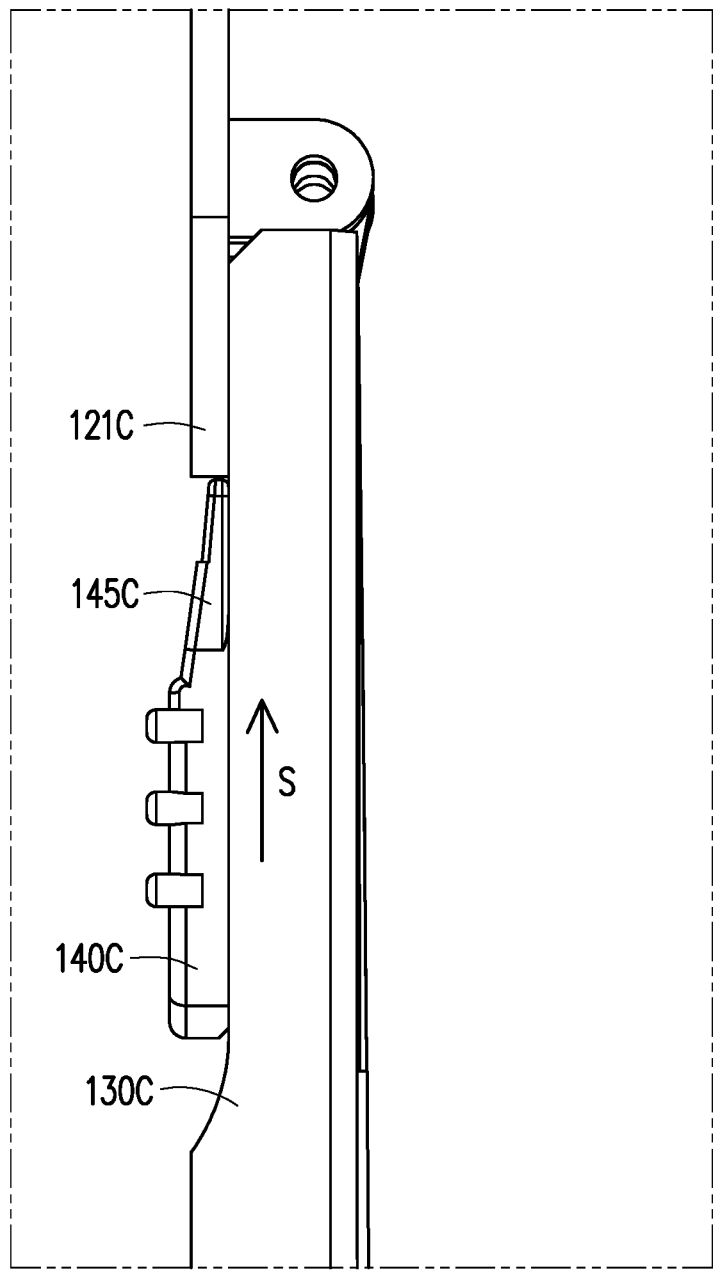
FIG. 10A to FIG. 10C are top views of FIG. 9A to FIG. 9C, respectively.
Figure 10B:
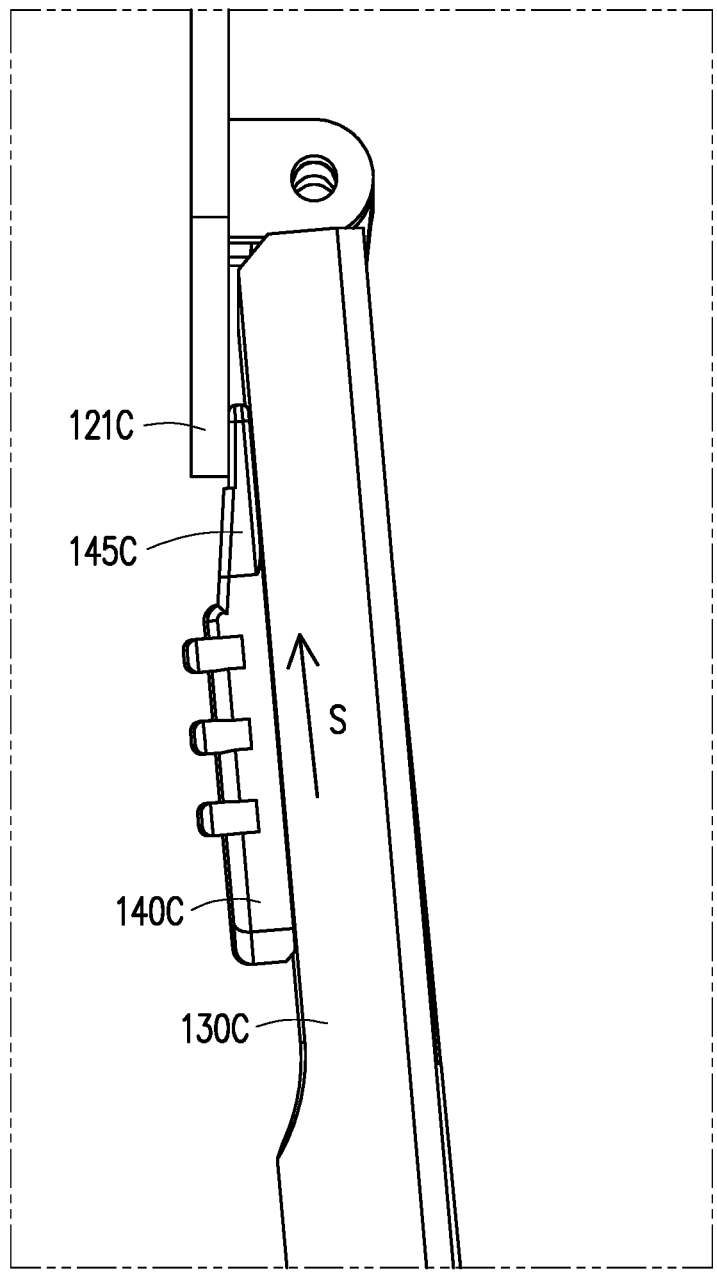
Figure 10C:
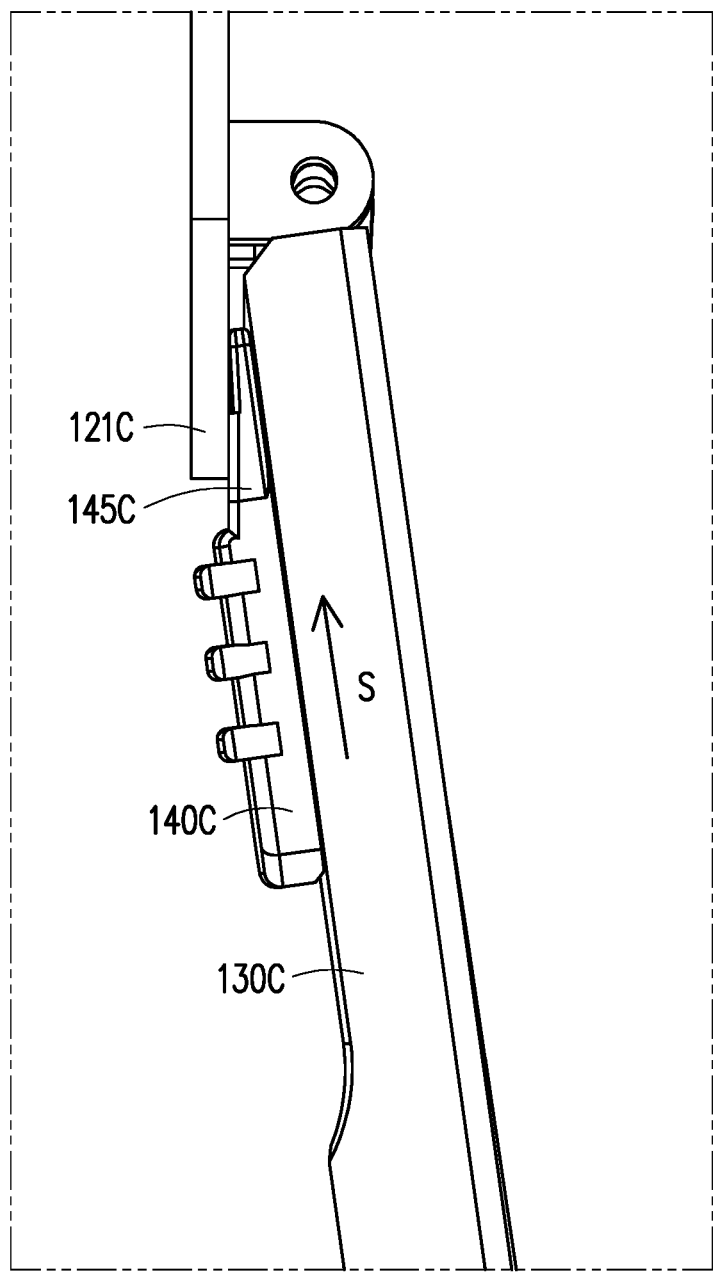

FIG. 8A is a 3D view of a head-mounted display according to another embodiment of the invention. FIG. 8B is a partial explosion view of the head-mounted display device of FIG. 8A. FIG. 8C is a 3D view of the head-mounted display device of FIG. 8A from another perspective. FIG. 9A to FIG. 9C are 3D views of the head-mounted display device of FIG. 8A in different states. FIG. 9D to FIG. 9F are partial front views of the head-mounted display device of FIG. 9A to FIG. 9C, respectively. FIG. 10A to FIG. 10C are top views of FIG. 9A to FIG. 9C, respectively. It is to be noted that the head-mounted display device of FIG. 9A to FIG. 9F omits the illustration of a cover plate to more clearly illustrate internal members thereof.

Referring to FIG. 8A, in this embodiment, a head-mounted display device 100C includes a cover plate 150C. The cover plate 150C can maintain integrity of appearance for the head mounted display device 100C and enhance the wearing comfort.

Specifically, referring to FIG. 8B and FIG. 8C, in this embodiment, an adjusting piece 140C includes protruding ribs 146C. The protruding ribs 146C protrude from an outer side of the adjusting piece 140C, and configured for the user to push the adjusting piece 140C with the thumb. Naturally, in other embodiments, the number and the type of the protruding ribs 146C are not limit to those illustrated in FIG. 8B and FIG. 8C.

A second positioning portion 132C of the present embodiment includes a depression D depressed from an inner side of a corresponding arm 130C. Specifically, three notches N are formed on a sidewall of the depression D. In this embodiment, since the number of the notches N formed on the sidewall of the depression D is three, the three-stage positioning can be achieved. The application is not limited to the above, and the number of the notches may be adjusted according to actual needs.

In this embodiment, a first positioning portion 141C includes a positioning block 1412 slidably disposed in the depression D, a bump 1431 corresponding to the notches N is provided on a side surface of the positioning block 1412.

Specifically, although the above description illustrates the configuration of one sidewall corresponding to one side surface of the positioning block 1412, in fact, the depression D is formed with the notches N on opposite sidewalls and the positioning block 1412 has two bumps 1431 for respectively corresponding to the notches N on the two sidewalls. The advantage of such a design is that the bump 1431 can move more stably on the notches N during a moving process of the adjusting piece 140C, but the present application is not limited thereto.

Although this embodiment is described by using an example in which the positioning block 1412 of the first positioning portion 141C has the bump 1431 and the depression D of the second positioning portion 132 is formed with the notches N, it is also possible that the positioning block is formed with the notches and the depression has the bump to form a bump-notch engagement in other embodiments. The application is not limited to the above, and the first positioning portion and the second positioning portion may be adjusted according to actual needs.

In this embodiment, the arm 130C includes an opening slot 134C located at a bottom portion of the depression D, and the adjusting piece 140C includes a main body 143C located at an outer side of the corresponding arm 130C and a connecting piece 144C passing through the opening slot 134C. The connecting piece 144C connects the main body 143C and the positioning block 1412 such that the positioning block 1412 synchronously moves in the depression D during a moving process of the main body 143C between a first position shown by FIG. 9A and FIG. 9D and a second position shown by FIG. 9C and FIG. 9F. In other words, when the adjusting piece 140C is in the second position shown by FIG. 9C and FIG. 9F or a third position shown by FIG. 9B and FIG. 9E, the bump 1413 is engaged in the corresponding notch N. The three-stage positioning of the adjusting piece 140C allows the arm 130C to have three different angles so that the head-mounted display device 100C is adapted to head sizes for different users.

In this embodiment, the connecting piece 144C is integrated with the main body 143C, and the connecting piece 144C is engaged with the positioning block 1412. However, in other embodiments, the manner in which the connecting piece 144C connects the main body 143C and the positioning block 1412 is not limited to the above.

Referring to FIG. 10A to FIG. 10C, in this embodiment, each of the adjusting pieces 140C includes an inserting portion 145C. The inserting portion 145C can enter a space between the corresponding arm 130C and a stopping piece 121C, as shown by FIG. 10B and FIG. 10C.

In this embodiment, a thickness of the inserting portion 145C is gradually decreased from an inner portion to a distal end along a direction S for allowing the adjusting piece 140C to enter the space between the arm 130C and the stopping piece 121C more smoothly. Naturally, in the foregoing embodiments of FIG. 1B and FIG. 5A, the adjusting pieces may also include the inserting portion to achieve the same effect for allowing the adjusting piece to enter the space between the arm and the stopping piece more smoothly.

In summary, the adjusting piece of the head-mounted display device of the present application is disposed on the pivot path of the arm such that the maximum angle of rotation the arm can be unfolded to is limited by the adjusting piece that enters and is caught between the arm and the main frame, so as to change the wearing space to be adapted to head sizes for users. In addition, the first positioning portion of the adjusting piece and the second positioning portion of the arm can have the adjusting piece that moves relative to the arm positioned at a specific point and prevented from being moved arbitrarily. Accordingly, a multi-stage positioning effect can be achieved and the angle of rotation of the arm can be maintained. As a result, the head-mounted display device of the present application can match head sizes for various users. Users with different head sizes can select the maximum angle of rotation appropriately based on wearing comfort and stability so the head mounted display device can be securely worn on the user's head and less likely to slide or shake due to its own weight or inertia.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A head-mounted display device, comprising:
a display portion;
a main frame, carrying the display portion;
two arms, disposed on opposite sides of the main frame, an end portion of each of the arms being pivotally connected to the main frame such that the arms are adapted to rotate away from the main frame during an unfolding process and adapted to rotate toward the main frame during a folding process; and
two adjusting pieces, respectively disposed on pivot paths of the two arms, each of the adjusting pieces being adapted to from a structural interference with the corresponding arm and the main frame during the unfolding process to limit a degree of rotation of the arm,
wherein the main frame comprises two stopping pieces, the main frame has two pivoting parts pivotally connected to the end portion of the two arms respectively, and each of the stopping pieces extends from the corresponding pivoting part toward the corresponding arm, and extends to an outer side of the corresponding arm, each of the adjusting pieces is adapted to move between a first position and a second position on the arm, and the second position is located between the first position and the end portion, wherein
when each of the adjusting pieces is in the first position, the two arms are adapted to be unfolded to a first maximum degree of rotation; and
when each of the adjusting pieces is in the second position, the two arms are adapted to be unfolded to a second maximum degree of rotation, meanwhile, each of the adjusting pieces enters a space between the corresponding arm and the stopping piece to form a structural interference with the arm and the stopping piece, and the second maximum degree of rotation is less than the first maximum degree of rotation.

2. The head-mounted display device according to claim 1, wherein each of the adjusting pieces comprises a first positioning portion, each of the arms comprises a second positioning portion corresponding to the first positioning portion, and when each of the adjusting pieces is in the second position, the first positioning portion forms a structural interference with the second positioning portion such that each of the adjusting pieces is held in the second position.

3. The head-mounted display device according to claim 2, wherein each of the second positioning portions protrudes from an inner side of the corresponding arm and comprises a notch, each of the first positioning portions comprises a bump corresponding to the notch, and when each of the adjusting pieces is in the second position, the bump is engaged in the notch.

4. The head-mounted display device according to claim 3, wherein each of the second positioning portions further comprises a guiding surface facing the corresponding bump, the notch is located at one end of the guiding surface, and during a moving process of each of the adjusting pieces from the first position to the second position, the bump abuts against the guiding surface, moves along the guiding surface and eventually enters the notch.

5. The head-mounted display device according to claim 2, wherein when each of the adjusting pieces is in at least one third position between the first position and the second position, the first positioning portion forms a structural interference with the second positioning portion such that each of the adjusting pieces is held in the at least one third position, and when each of the adjusting pieces is in the at least one third position, the two arms are adapted to be unfolded to a third maximum degree of rotation, meanwhile, each of the adjusting pieces enters a space between the corresponding arm and the stopping piece to from a structural interference with the arm and the stopping piece, and the third degree of angle is between the second maximum degree of rotation and the first maximum degree of rotation.

6. The head-mounted display device according to claim 5, wherein each of the second positioning portions protrudes from an inner side of the corresponding arm and comprises a plurality of notches, each of the first positioning portions comprises a bump corresponding to the notches, and when each of the adjusting pieces is in the second position or the at least one third position, the bump is engaged in the corresponding notch.

7. The head-mounted display device according to claim 6, wherein each of the second positioning portions further comprises a plurality of guiding surfaces facing the corresponding bump, the guiding surfaces and the notches are alternately arranged, and during a moving process of each of the adjusting pieces from the first position to the second position via the at least one third position, the bump sequentially abuts against the guiding surfaces, moves along the guiding surfaces and enters the corresponding notches.

8. The head-mounted display device according to claim 5, wherein each of the second positioning portions comprises a depression depressed from an inner side of the corresponding arm, a plurality of notches are formed on a sidewall of the depression, the first positioning portion comprises a positioning block slidably disposed in the depression, a bump corresponding to the notches is provided on a side surface of the positioning block, and when each of the adjusting pieces is in the second position or the at least one third position, the bump is engaged in the corresponding notch.

9. The head-mounted display device according to claim 8, wherein each of the arms comprises an opening slot located at a bottom portion of the depression, each of the adjusting pieces comprises a main body located at the outer side of the corresponding arm and a connecting piece passing through the opening slot, and the connecting piece connects the main body and the positioning block such that the positioning block synchronously moves in the depression during a moving process of the main body between the first position and the second position.

10. The head-mounted display device according to claim 1, wherein each of the adjusting pieces comprises an inserting portion, adapted to enter the space between the corresponding arm and the stopping piece, and a thickness of the inserting portion is gradually decreased from an inner portion to a distal end.

11. The head-mounted display device according to claim 1, wherein each of the adjusting pieces comprises a first stopping portion, each of the arms comprises a second stopping portion corresponding to the first stopping portion, and during a moving process of each of the adjusting pieces from the second position toward the first position, the first stopping portion forms a structural interference with the second stopping portion to limit a moving distance of each of the adjusting pieces.

* * * * *